(12) United States Patent
Sabi et al.

(10) Patent No.: US 9,373,866 B2
(45) Date of Patent: Jun. 21, 2016

(54) SOLID ELECTROLYTE BATTERY

(75) Inventors: Yuichi Sabi, Tokyo (JP); Saori Hayashi, Kanagawa (JP); Susumu Sato, Miyagi (JP)

(73) Assignee: SONY CORPORATION, Tokyo (JP)

( * ) Notice: Subject to any disclaimer, the term of this patent is extended or adjusted under 35 U.S.C. 154(b) by 299 days.

(21) Appl. No.: 13/983,260

(22) PCT Filed: Feb. 10, 2012

(86) PCT No.: PCT/JP2012/053735
§ 371 (c)(1),
(2), (4) Date: Aug. 1, 2013

(87) PCT Pub. No.: WO2012/111783
PCT Pub. Date: Aug. 23, 2012

(65) Prior Publication Data
US 2013/0309568 A1   Nov. 21, 2013

(30) Foreign Application Priority Data
Feb. 15, 2011  (JP) ................................. 2011-029604

(51) Int. Cl.
*H01M 10/04* (2006.01)
*H01M 4/13* (2010.01)
(Continued)

(52) U.S. Cl.
CPC ............ *H01M 10/0436* (2013.01); *H01M 4/13* (2013.01); *H01M 4/366* (2013.01);
(Continued)

(58) Field of Classification Search
CPC ...... H01M 4/13; H01M 4/366; H01M 10/052; H01M 10/0585; H01M 10/0436; H01M 10/0562; Y02E 60/122
USPC .......... 429/211, 231.95, 231.9, 213; 423/306, 423/274; 427/58
See application file for complete search history.

(56) References Cited

U.S. PATENT DOCUMENTS 4,948,685 A * 8/1990 Ohsawa et al. ............... 429/213
2007/0026312 A1 * 2/2007 Imachi et al. ................. 429/217

(Continued)

FOREIGN PATENT DOCUMENTS

JP      56156675  A  * 12/1981
JP      07-006753      1/1995
(Continued)

OTHER PUBLICATIONS

J.B. Bates et al., "Thin-film lithium and lithium-ion batteries," Solid State Ionics, vol. 135, 2000, pp. 33-45. (13 pages).

*Primary Examiner* — Carlos Barcena
(74) *Attorney, Agent, or Firm* — Chip Law Group

(57) ABSTRACT

Provided is a solid electrolyte battery that has favorable charge-discharge characteristics with impedance reduced.
This solid electrolyte battery has, on a substrate 10, a stacked body of a positive electrode side current collector film 30, a positive electrode protective film 31, a positive electrode active material film 40, a solid electrolyte film 50, a negative electrode potential formation layer 64, and a negative electrode side current collector film 70 stacked in this order. The positive electrode active material film 40 is composed of an amorphous positive electrode active material. The positive electrode protective film 31 is composed of $LiCoO_2$, $LiMn_2O_4$, $LiNiO_2$, or the like.

16 Claims, 21 Drawing Sheets

(51) Int. Cl.
- *H01M 4/36* (2006.01)
- *H01M 10/052* (2010.01)
- *H01M 10/0562* (2010.01)
- *H01M 10/0585* (2010.01)

(52) U.S. Cl.
CPC ........ *H01M10/052* (2013.01); *H01M 10/0562* (2013.01); *H01M 10/0585* (2013.01); *Y02E 60/122* (2013.01)

(56) References Cited

U.S. PATENT DOCUMENTS

| | | | |
|---|---|---|---|
| 2007/0031732 A1* | 2/2007 | Chiang et al. | 429/231.95 |
| 2008/0032236 A1* | 2/2008 | Wallace | H01M 6/40 430/319 |
| 2009/0117020 A1* | 5/2009 | Manthiram et al. | 423/274 |
| 2011/0117433 A1* | 5/2011 | Sabi | C01B 25/45 429/220 |
| 2011/0177398 A1* | 7/2011 | Affinito | H01M 4/134 429/325 |
| 2013/0017441 A1* | 1/2013 | Affinito | H01M 2/1673 429/211 |

FOREIGN PATENT DOCUMENTS

| | | |
|---|---|---|
| JP | 10-144291 | 5/1998 |
| JP | 2010-257893 | 11/2010 |
| JP | 2011-108532 | 6/2011 |

* cited by examiner

SOLID ELECTROLYTE BATTERY

CROSS REFERENCES TO RELATED APPLICATIONS

The present application is a national stage of International Application No. PCT/JP2012/053735 filed on Feb. 10, 2012 and claims priority to Japanese Patent Application No. 2011-029604 filed on Feb. 15, 2011, the disclosure of which is incorporated herein by reference.

BACKGROUND

The present technique relates to a solid electrolyte battery. More particularly, the technique relates to a thin-film solid electrolyte battery that has a constituent member formed from a thin film with the use of a thin-film deposition technique.

Lithium ion secondary batteries have been widely used for mobile electronic devices, etc., because the batteries have an excellent energy density. Among these lithium ion secondary batteries, from the viewpoints of safety and reliability, research and development have been promoted in an energetic way on all-solid lithium ion secondary batteries using solid electrolytes without containing any organic electrolyte solution.

Development has been actively carried out on thin-film lithium secondary batteries as a form of the all-solid lithium ion secondary batteries. The thin-film lithium ion secondary batteries are each obtained as a secondary battery by forming, from thin films, a current collector, an active material, and an electrolyte which constitute the battery. The respective thin films constituting the thin-film lithium secondary batteries are formed with the use of a film formation method such as a sputtering method or a vapor deposition method (see, for example, Non-Patent Document 1).

CITATION LIST

Non-Patent Document

Non-Patent Document 1: Thin-Film lithium and lithium-ion batteries, J. B. Bates et al.: Solid State Ionics, 135, 33 (2000)

SUMMARY

Problems to be Solved by the Invention

The applicant has recently invented, as a novel positive electrode active material, a lithium phosphate compound represented by the following formula (1) in an amorphous state, and filed a patent application for this compound. (Japanese Patent Application No. 2009-263417)

$$Li_xCu_yPO_4 \qquad \text{Formula (1)}$$

(in the formula, x represents a composition ratio of lithium; y represents a composition ratio of copper; x meets $1.0 \leq x \leq 5.0$; and y meets $1.0 \leq y \leq 4.0$.)

The material (hereinafter, also referred to as an amorphous positive electrode active material) which functions as a positive electrode active material in an amorphous state as described above exhibits favorable characteristics, and achieves a high degree of practicality, through the application of the material to, in particular, thin-film solid electrolyte batteries which have constituent members such as a positive electrode, an electrolyte, and a negative electrode each formed from a thin film.

On the other hand, when the amorphous positive electrode active material directly contacts with the positive electrode current collector, the impedance is increased to cause the problems of an increase in voltage in high-speed charging and a decrease in voltage in high-speed discharging.

Therefore, an object of the present technique is to provide a solid electrolyte battery that has favorable charge-discharge characteristics with impedance reduced.

Solutions to Problems

In order to solve the problem mentioned above, the present technique provides a solid electrolyte battery including a positive electrode side layer, a negative electrode side layer, and a solid electrolyte layer placed between the positive electrode side layer and the negative electrode side layer. The positive electrode side layer includes a positive electrode current collector layer, a positive electrode active material layer containing a lithium-containing material that functions as a positive electrode active material in an amorphous state, and a positive electrode protective layer placed between the positive electrode current collector layer and the positive electrode active material layer, for suppressing a reaction between the positive electrode current collector layer and the positive electrode active material layer.

According to the present technique, a layer for suppressing a reaction between the positive electrode current collector layer and the positive electrode active material layer is placed between the positive electrode current collector layer and the positive electrode active material layer. This placement can suppress a reaction between the amorphous positive electrode active material and the positive electrode current collector layer to suppress the increase in impedance.

Effects of the Invention

According to the present technique, favorable charge-discharge characteristics can be achieved with impedance reduced.

Additional features and advantages are described herein, and will be apparent from the following Detailed Description and the figures.

DETAILED DESCRIPTION

Figure 1:
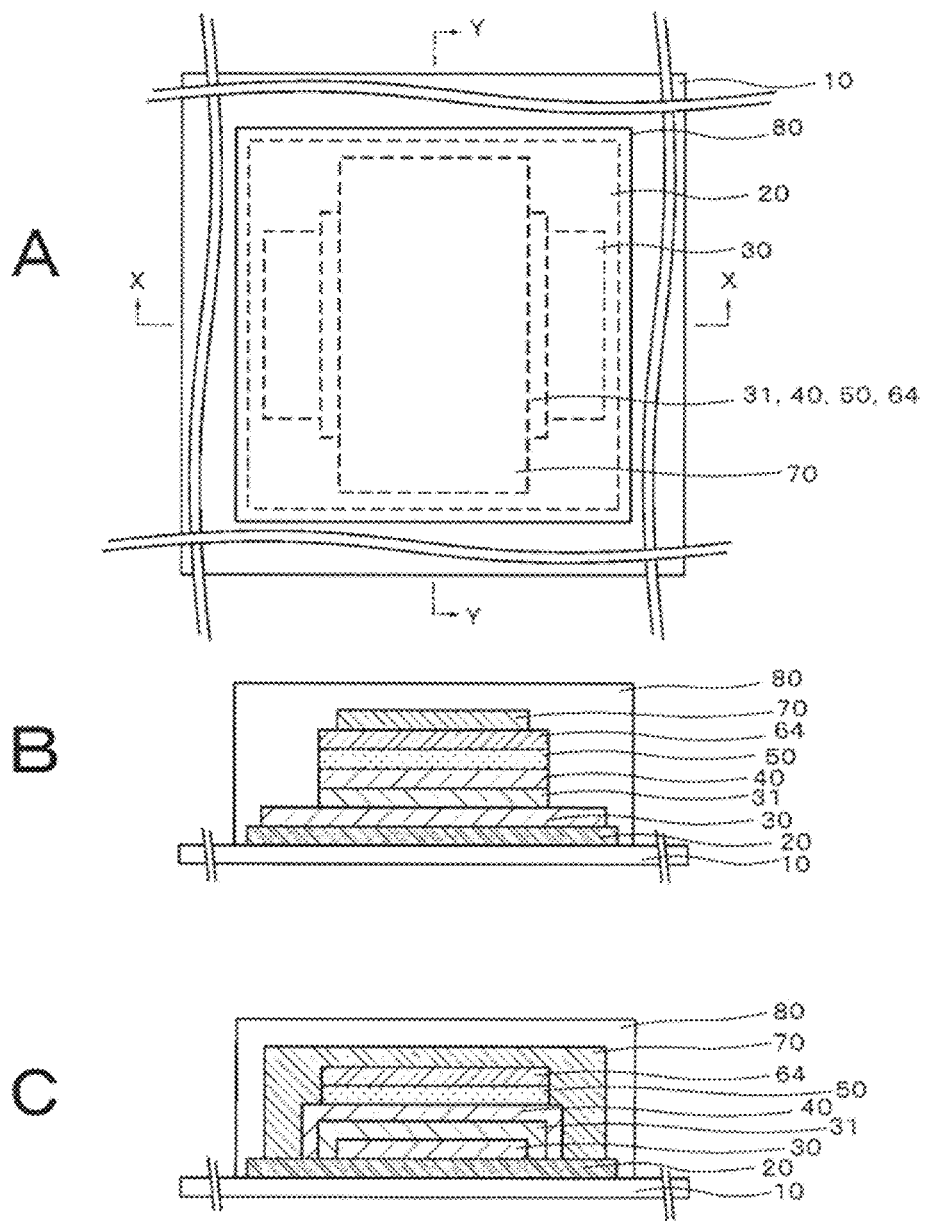
FIG. 1A is a plan view of a solid electrolyte battery according to a first embodiment of the present technique.
FIG. 1B is a cross-sectional view illustrating a cross section along the line X-X of FIG. 1A.
FIG. 1C is a cross-sectional view illustrating a cross section along the line Y-Y of FIG. 1A.

Embodiments of the present technique will be now described below with reference to the drawings.
1. First Embodiment (First Example of Solid Electrolyte Battery)
2. Second Embodiment (Second Example of Solid Electrolyte Battery)
3. Other Embodiment (Modified Example)
1. First Embodiment FIG. 1 shows the configuration of a solid electrolyte battery according to a first embodiment of the present technique. This solid electrolyte battery is, for example, a solid electrolyte secondary battery that is able to be charged and discharged. FIG. 1A is a plan view of the solid electrolyte battery. FIG. 1B is a cross-sectional view illustrating a cross section along the line X-X of FIG. 1A. FIG. 1C is a cross-sectional view illustrating a cross section along the line Y-Y of FIG. 1A.

As shown in FIG. 1, this solid electrolyte battery has an inorganic insulating film 20 formed on a substrate 10, and has, on the inorganic insulating film 20, a stacked body of a positive electrode side current collector film 30, a positive electrode protective film 31, a positive electrode active material film 40, a solid electrolyte film 50, a negative electrode potential formation layer 64, and a negative electrode side current collector film 70 stacked in this order. An entirely protective film 80 composed of, for example, an ultraviolet curable resin is formed so as to entirely cover the stacked body. Further, the inorganic insulating film 20 may be formed on the entirely protective film 80.

(Substrate)

For example, a polycarbonate (PC) resin substrate, a fluorine resin substrate, a polyethylene terephthalate (PET) substrate, a polybutylene terephthalate (PBT) substrate, a polyimide (PI) substrate, a polyamide (PA) substrate, a polysulfone (PSF) substrate, a polyethersulfone (PES) substrate, a polyphenylenesulfide (PPS) substrate, a polyetheretherketone (PEEK) substrate, polyethylene naphthalate (PEN), a cycloolefin polymer (COP), etc. can be used as the substrate 10. While the material of the substrate is not to be considered particularly limited, a substrate is more preferred which is less hygroscopic but resistant to moisture.

(Positive Electrode Side Current Collector Film 30)

Cu, Mg, Ti, Fe, Co, Ni, Zn, Al, Ge, In, Au, Pt, Ag, Pd, and the like, or alloys containing any of these elements can be used as a material constituting the positive electrode side current collector film 30.

(Positive Electrode Active Material Film 40)

Materials that function as positive electrode active materials in amorphous states (amorphous positive electrode active material materials) can be used for the positive electrode active material film 40. These materials include lithium-containing materials that function as positive electrode active materials in amorphous states. Specifically, the materials include, for example, amorphous lithium phosphate compounds. More specifically, the materials include, for example, amorphous lithium phosphate compounds containing Li; P; any element selected from Cu, Ni, Co, Mn, Au, Ag, and Pd; and O.

These lithium phosphate compounds have the following excellent characteristics as positive electrode active materials. More specifically, the compounds have a high potential with respect to a pair Li$^+$/Li. The compounds are excellent in terms of potential plateau, that is, vary little in potential with changes in composition. The compounds are high in capacity, because of the high composition ratios of lithium. The compounds have high electric conductivity. The compounds are also excellent in charge-discharge cycle characteristics, because the crystal structures are not collapsed or the like by repeated charge and discharge, unlike crystalline positive electrode active materials. Furthermore, the compounds allows process simplification, yield improvements, and the use of resin substrates, because the compounds can be formed without anneal. Allowing the use of resin substrates eliminates the need to use expensive heat-resistant glass as the substrate 10, and thus can also reduce the manufacturing cost.

The positive electrode active material film 40 may be, for example, composed of a lithium phosphate compound represented by the following formula (1) in an amorphous state, as the lithium phosphate compound described above.

$$Li_xCu_yPO_4 \quad (1)$$

(in the formula, x represents a composition ratio of lithium, and y represents a composition ratio of copper.)

In the lithium phosphate compound represented by the formula (1), the composition ratio x of lithium preferably has a range of 1.0≤x≤5.0, and more preferably 1.0≤x≤4.5. This is because the increased impedance makes charge or discharge impossible if the composition ratio x of lithium is less than 1.0. While the upper limit of the composition ratio x of lithium is not particularly limited, the limit for maintaining the potential is regarded as the upper limit of the composition ratio x of Li. As far as confirmation can be obtained, the upper limit is preferably 5.0 or less, and more preferably 4.5 or less.

In the lithium phosphate compound represented by the formula (1), the composition ratio y of copper preferably has a range of 1.0≤y≤4.0 in terms of achievement of adequate charge-discharge capacity. In particular, if the composition ratio y of copper is less than 1.0, the charge-discharge capacity will be decreased drastically. While the upper limit of the composition ratio y of copper is not particularly limited, the charge-discharge capacity will be decreased gradually if the composition ratio y is greater than 3. While the composition ratio y is preferably 4 or less for about half the maximum capacity as a guide, the composition with the ratio of 4 or more is also possible at the expense of charge-discharge capacity in the case of being advantageous in aspects such as durability and ionic conductivity. In addition, in the lithium phosphate compound represented by the formula (1), the composition ratio y of copper more preferably has a lower limit of 2.2≤y in terms of achievement of favorable charge-discharge cycle characteristics.

The positive electrode active material film 40 may be composed of a lithium phosphate compound represented by the following formula (2) in an amorphous state.

$$Li_xNi_yPO_z \qquad \text{Formula (2)}$$

(in the formula, x represents a composition ratio of lithium; y represents a composition ratio of nickel; z represents a composition ratio of oxygen; x meets 1.0≤x≤5.0; y meets 2.0≤y≤10; and z represents a composition ratio of oxygen; z is a ratio with which oxygen is contained stably depending on the composition ratio of Ni and P.)

In the formula (2), the composition ratio x of lithium preferably has a range of 1.0≤x≤5.0. This is because the increased impedance makes charge or discharge impossible if the composition ratio x of lithium is less than 1.0. While the upper limit of the composition ratio x of lithium is not particularly limited, the limit for maintaining the potential is regarded as the upper limit of the composition ratio x of lithium. As far as confirmation can be obtained, the composition ratio x of lithium is preferably 5.0 or less.

In the formula (2), the composition ratio y of Ni preferably has a range of 2.0≤y≤10.0 in terms of achievement of adequate charge-discharge capacity. For example, if the composition ratio y of Ni is less than 2.0, the charge-discharge capacity will be decreased drastically. While the upper limit of the composition ratio y of Ni is not particularly limited, the charge-discharge capacity will be decreased gradually if the composition ratio y of Ni is greater than 4. The composition ratio y of Ni is preferably 10 or less for about half the maximum capacity as a guide. It is to be noted that the composition ratio may be also over 10.0 at the expense of charge-discharge capacity in the case of being advantageous in aspects such as durability and ionic conductivity.

In the formula (2), the composition ratio z of oxygen is the ratio of oxygen contained stably depending on the composition ratio of Ni and the composition ratio of P.

The positive electrode active material film 40 may be composed of an amorphous lithium phosphate compound containing Li; P; any element M1 selected from Ni, Co, Mn, Au, Ag, and Pd; at least one element M2 (M1≠M2) selected from Ni, Co, Mn, Au, Ag, Pd, and Cu; and O.

The positive electrode active material film 40 may be composed of an amorphous lithium phosphate compound containing Li; P; any element M1 selected from Ni, Co, Mn, Au, Ag, and Pd; any element M2 (M1≠M2) selected from Ni, Co, Mn, Au, Ag, Pd, and Cu; at least one additive element M3 selected from B, Mg, Al, Si, Ti, V, Cr, Fe, Zn, Ga, Ge, Nb, Mo, In, Sn, Sb, Te, W, Os, Bi, Gd, Tb, and Dy; and O.

This positive electrode active material film 40 is a completely amorphous single-phase thin film containing no crystalline phase. The amorphous single phase of the positive electrode active material film 40 can be confirmed by observing a cross section of the film under a transmission electron microscope (TEM). More specifically, when this positive electrode active material film 40 is observed at a cross section thereof under a transmission electron microscope (TEM), a state with no crystal grains present can be confirmed in the TEM image. In addition, the state can be also confirmed from an electron diffraction image.

(Positive Electrode Protective Film 31)

The positive electrode protective film 31 is placed between the positive electrode side current collector film 30 and the positive electrode active material film 40. It is to be noted that, although not shown in the figure, the positive electrode protective film 31 may be placed between the positive electrode side current collector film 30 and the positive electrode active material film 40, and further placed between the positive electrode active material film 40 and the solid electrolyte film 50.

It is conceivable that the progress of a reaction between the positive electrode active material film 40 (for example, typically Li, P, Cu, O) and the positive electrode side current collector film 30 (for example, typically Ti) makes it likely that a decrease in battery characteristics or an increase in impedance will be caused with charge and discharge. In order to suppress this decrease or increase, the positive electrode protective film 31 is placed between the positive electrode side current collector film 30 and the positive electrode active material film 40.

It is to be noted that the adverse effect of the reaction between the positive electrode active material film 40 typically composed of a lithium phosphate compound and the positive electrode side current collector film 30 typically composed of a metal material is greater when the positive electrode active material film 40 is formed on the positive electrode side current collector film 30 after forming the positive electrode side current collector film 30 than when the positive electrode side current collector film 30 is formed on the positive electrode active material film 40 after forming the positive electrode active material film 40. This is because it is conceivable that the reactivity between a material to be subjected to material deposition and a material to be deposited is higher when the positive electrode active material film 40 is formed on the positive electrode side current collector film 30 after forming the positive electrode side current collector film 30 than when the positive electrode side current collector film 30 is formed on the positive electrode active material film 40 after forming the positive electrode active material film 40.

As the material constituting the positive electrode protective film 31, materials can be used which suppress the reaction between the positive electrode side current collector film 30 and the positive electrode active material film 40 and have movable lithium ions. These materials include positive electrode active materials which are more stable as compared with the amorphous positive electrode active materials mentioned above. Specifically, the materials include, for example, lithium oxides containing Li; a transition metal such as Co, Mn, and Ni; and O. More specifically, the materials include lithium-transition metal oxides such as $LiCoO_2$, $LiMn_2O_4$, and $LiNiO_2$. The material constituting the positive electrode protective film 31 is preferably less reactive as well as stable, and thus preferably have a crystalline phase such as crystals (single crystals, polycrystals) or microcrystals.

The positive electrode protective film 31 preferably has a thickness of 5 nm or more and 20 nm or less. This is because the thickness of less than 5 nm decreases the effect because of the excessive thinness. This is also because the thickness of more than 20 nm decreases the effect due to the influence of the impedance of the positive electrode protective film 31 itself because of the excessive thickness.

(Solid Electrolyte Film 50)

Lithium phosphate ($Li_3PO_4$), $Li_3PO_{4-x}N_x$ of lithium phosphate with nitrogen added thereto ($Li_3PO_4$) (generally, referred to as LiPON), $Li_xB_2O_{3-y}N_y$, $Li_4SiO_4$—$Li_3PO_4$, $Li_4SiO_4$—$Li_3VO_4$, and the like can be used as the material constituting the solid electrolyte film 50.

(Negative Electrode Potential Formation Layer 64)

For example, oxides containing one or more of Mn, Co, Fe, P, Ni, and Si can be used as the negative electrode potential formation layer 64. These oxides include, more specifically, $LiCoO_2$ and $LiMn_2O_4$. For this solid electrolyte battery, the negative electrode potential formation layer 64 is formed instead without forming any negative electrode active material film at the time of manufacture. The negative electrode active material is produced on the negative electrode side with charging. Produced on the negative electrode side is a layer excessively containing a Li metal or Li at the interface between the solid electrolyte film 50 and the negative electrode (hereinafter, referred to as a Li excessive layer). While using this excessively deposited Li (Li excessive layer) as the negative electrode active material, high durability against repeated charge and discharge is provided without damaging the charge-discharge characteristics.

The negative electrode potential formation layer 64 incorporates some Li when the battery is initially charged, but keeps the Li content at a certain value in the process of subsequent charge and discharge, and thereby suppresses diffusion of Li into the negative electrode side current collector film and suppresses degradation of the negative electrode side current collector film 70 to drastically improve repeated charge-discharge characteristics, and furthermore, has the effect of minimizing the loss in amount of charge by diffusion of Li into the negative electrode side current collector film 70. If the negative electrode potential formation layer 64 is not present, Li will diffuse into the negative electrode side current collector film 70 to fail to keep the total amount of Li with battery charging and discharging at a certain value, and the charge-discharge characteristics will be thus degraded.

It is to be noted that while the thickness of the Li excessive layer formed at the interface between the solid electrolyte film 50 and the negative electrode varies in response to the thickness of the positive electrode active material film 40, the film thickness of the negative electrode potential formation layer 64 is not directly related to the thickness of the Li excessive layer, or not dependent on the thickness of the positive electrode active material film 40, because the negative electrode potential formation layer 64 only has to adequately function as a protective film against the Li excessive layer formed at the interface between the solid electrolyte film 50 and the negative electrode.

In this solid electrolyte battery, when the capacity of the negative electrode active material is smaller than the Li amount in the positive electrode active material, the excessive Li in the negative electrode active material is deposited at the interface to form a Li excessive layer, and a function thereof is used as a negative electrode active material. In this solid electrolyte battery, the negative electrode potential formation layer 64 is formed to be substantially thinner in film thickness than the positive electrode active material film 40 to have substantially no negative electrode active material present in an uncharged state.

The negative electrode potential formation layer 64 may be a material used as a negative electrode active material, and thus more precisely, some of the layer functions as a negative electrode active material, whereas the rest thereof functions as a protective film against the Li excessive layer. When the negative electrode potential formation layer 64 is substantially thinner in film thickness than the positive electrode active material film 40, most of the layer is used as a protective film.

This solid electrolyte battery may be configured so that the Li excessive layer deposited at the interface to function as a negative electrode active material performs more than the half of driving the battery, by forming the negative electrode potential formation layer 64 to be substantially thinner in film thickness than the positive electrode active material film 40.

(Negative Electrode Side Current Collector Film 70)

Cu, Mg, Ti, Fe, Co, Ni, Zn, Al, Ge, In, Au, Pt, Ag, Pd, and the like, or alloys containing any of these elements can be used as a material constituting the negative electrode side current collector film 70.

(Inorganic Insulating Film 20)

The material constituting the inorganic insulating film 20 may be any material as long as the material can form a film that is less hygroscopic and resistant to moisture. Simple substance of oxides or nitrides or sulfides of Si, Cr, Zr, Al, Ta, Ti, Mn, Mg, and Zn, or mixtures thereof can be used as this material. More specifically, $Si_3N_4$, $SiO_2$, $Cr_2O_3$, $ZrO_2$, $Al_2O_3$, $TaO_2$, $TiO_2$, $Mn_2O_3$, MgO, ZnS, etc., or a mixture thereof is used.

(Method for Manufacturing Solid Electrolyte Battery)

The solid electrolyte battery described above is manufactured, for example, in the following way.

First, the inorganic insulating film 20 is formed on the substrate 10. Next, the positive electrode side current collector film 30, the positive electrode protective film 31, the positive electrode active material film 40, the solid electrolyte film 50, the negative electrode potential formation layer 64, and the negative electrode side current collector film 70 are sequentially formed on the inorganic insulating film 20, thereby forming the stacked body. Next, the entirely protective film 80 composed of, for example, an ultraviolet curable resin is formed over the substrate (organic insulating substrate) 10, so as to entirely cover the stacked body and the inorganic insulating film 20. The solid electrolyte battery according to the first embodiment of the present technique can be formed in accordance with the series of steps described above.

(Methods for Forming Thin Films)

Methods will be described for forming the inorganic insulating film 20, the positive electrode side current collector film 30, the positive electrode protective film 31, the positive electrode active material film 40, the solid electrolyte film 50, the negative electrode potential formation layer 64, and the negative electrode side current collector film 70.

The respective thin films can be formed by gas phase methods such as, for example, a PVD (Physical Vapor Deposition) method or a CVD (Chemical Vapor Deposition) method. In addition, the films can be formed by liquid phase methods such as electroplating, electroless plating, an application, or a sol-gel method. In addition, the films can be formed by solid phase methods such as an SPE (solid-phase epitaxy) method or an LB (Langmuir-Blodgett) method.

The PVD method refers to a method of, once through evaporation or vaporization of a thin-film raw material for thin-film formation by energy such as heat or plasma, forming a thin film of the raw material on a substrate. Examples of the PVD method include, for example, a vacuum deposition method, a sputtering method, an ion plating method, a MBE (molecular beam epitaxy) method, and a laser abrasion method.

The CVD method refers to a method of applying energy such as heat, light, or plasma to a thin-film constituent material supplied as a gas for the decomposition and reaction of raw-material gas molecules to form an intermediate product, and depositing a thin film through adsorption, reaction, and desorption on a substrate surface.

Examples of the CVD method include, for example, a thermal CVD method, a MOCVD (Metal Organic Chemical Vapor Deposition) method, a RF plasma CVD method, an optical CVD method, a laser CVD method, and a LPE (Liquid Phase Epitaxy) method.

It is easy for one skilled in the art to form the desirably configured inorganic insulating film 20, the positive electrode side current collector film 30, the positive electrode protective film 31, the positive electrode active material film 40, the solid electrolyte film 50, the negative electrode potential formation layer 64, and the negative electrode side current collector film 70 by the thin-film formation methods described above. More specifically, one skilled in the art can easily form the desirably configured inorganic insulating film 20, positive electrode side current collector film 30, positive electrode protective film 31, positive electrode active material film 40, solid electrolyte film 50, negative electrode potential formation layer 64, and negative electrode side current collector film 70 by appropriately selecting the thin-film materials, thin-film formation method, thin-film formation conditions, etc.

2. Second Embodiment

Figure 2:
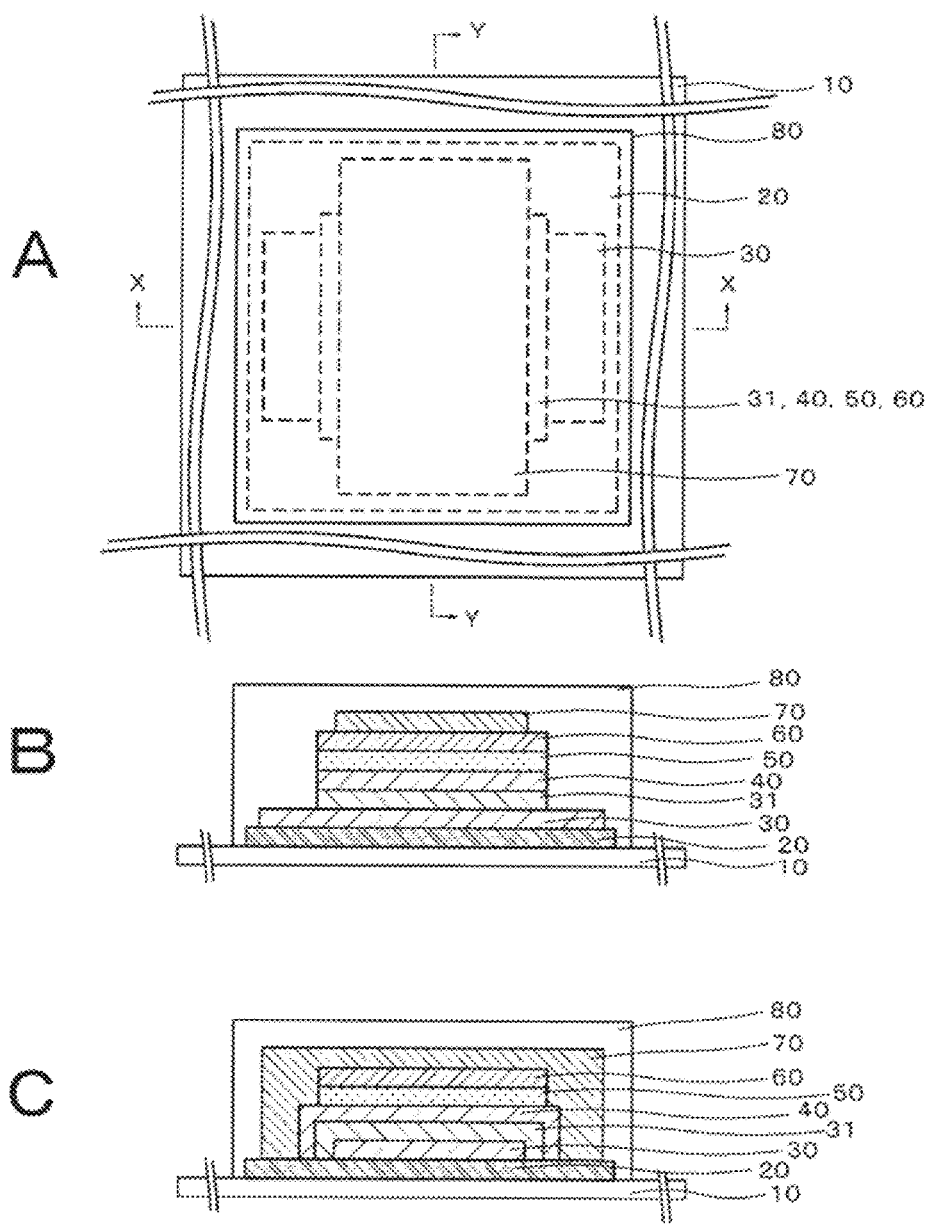
FIG. 2A is a plan view of a solid electrolyte battery according to a second embodiment of the present technique.
FIG. 2B is a cross-sectional view illustrating a cross section along the line X-X of FIG. 2A.
FIG. 2C is a cross-sectional view illustrating a cross section along the line Y-Y of FIG. 2A.

A solid electrolyte battery according to a second embodiment of the present technique will be described. This solid electrolyte battery is, for example, a solid electrolyte secondary battery that is able to be charged and discharged. FIG. 2 shows the configuration of a solid electrolyte battery according to the second embodiment of the present technique. FIG. 2A is a plan view of the solid electrolyte battery. FIG. 2B is a cross-sectional view illustrating a cross section along the line X-X of FIG. 2A. FIG. 2C is a cross-sectional view illustrating a cross section along the line Y-Y of FIG. 2A.

This solid electrolyte battery has an inorganic insulating film 20 formed on a substrate 10, and has, on the inorganic insulating film 20, a stacked body of a positive electrode side current collector film 30, a positive electrode protective film 31, a positive electrode active material film 40, a solid electrolyte film 50, a negative electrode active material film 60, and a negative electrode side current collector film 70 stacked in this order. An entirely protective film 80 composed of, for example, an ultraviolet curable resin is formed so as to entirely cover the stacked body and the inorganic insulating film 20. Further, the inorganic insulating film 20 may be formed on the entirely protective film 80.

The substrate 10, the inorganic insulating film 20, the positive electrode side current collector film 30, the positive electrode protective film 31, the positive electrode active material film 40, the solid electrolyte film 50, the negative electrode side current collector film 70, and the entirely protective film 80 are configured in the same fashion as in the first embodiment, and detailed descriptions thereof will be thus omitted. The negative electrode active material film 60 is configured in the following fashion.

[Negative Electrode Active Material Film]

The material constituting the negative electrode active material film 60 may be any material as long as the material is likely to store and desorb lithium ions, and able to store and desorb many lithium ions in and from the negative electrode active film. Any oxide of Sn, Si, Al, Ge, Sb, Ag, Ga, In, Fe, Co, Ni, Ti, Mn, Ca, Ba, La, Zr, Ce, Cu, Mg, Sr, Cr, Mo, Nb, V, Zn, etc. can be used as this type of material. In addition, these oxides can be mixed and used.

Materials for the negative electrode active material film 60 specifically include, for example, silicon-manganese alloys (Si—Mn), silicon-cobalt alloys (Si—Co), silicon-nickel alloys (Si—Ni), niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), indium oxide (ITO) with Sn added thereto, zinc oxide with Al added thereto (AZO), zinc oxide with Ga added thereto (GZO), tin oxide with Sn added thereto (ATO), and tin oxide with F (fluorine) added thereto (FTO). In addition, these materials can be mixed and used. In addition, a Li metal may be used as a material constituting the negative electrode active material film 60.

(Method for Manufacturing Solid Electrolyte Battery)

The solid electrolyte battery described above is manufactured, for example, in the following way.

First, the inorganic insulating film 20 is formed on the substrate 10. Next, the positive electrode side current collector film 30, the positive electrode protective film 31, the positive electrode active material film 40, the solid electrolyte film 50, the negative electrode active material film 60, and the negative electrode side current collector film 70 are sequentially formed on the inorganic insulating film 20, thereby forming the stacked body. Next, the entirely protective film 80 composed of, for example, an ultraviolet curable resin is formed over the substrate 10, so as to entirely cover the stacked body and the inorganic insulating film 20. The solid electrolyte battery according to the second embodiment of the present technique can be formed in accordance with the series of steps described above.

EXAMPLES

The present technique will be specifically described below with the reference to examples, but not to be considered limited to only these examples.

Examples 1 to 2, Comparative Example 1

Example 1

The solid electrolyte battery configured as shown in FIG. 1 was prepared. A polycarbonate (PC) substrate of 1.1 mm in thickness was used as the substrate 10. SCZ ($SiO_2$—$Cr_2O_3$—$ZrO_2$) was deposited as the inorganic insulating film 20 on the substrate 10.

A metal mask is placed on the inorganic insulating film 20, and in a predetermined areas, as the positive electrode side current collector film 30, the positive electrode protective film 31, the positive electrode active material film 40, the solid electrolyte film 50, the negative electrode potential formation layer 64, and the negative electrode side current collector film 70 were sequentially formed to form a stacked body. A Ti film, a $Li_xCu_yPO_4$ film, a $Li_3PO_{4-x}N_x$ film, a $LiCoO_2$ film, and a Ti film were respectively formed as the positive electrode side current collector film 30, the positive electrode active material film 40, the solid electrolyte film 50, the negative electrode potential formation layer 64, and the negative electrode side current collector film 70.

The conditions for forming the respective thin films constituting the inorganic insulating film 20 and the stacked body were made as follows. It is to be noted that the film formation was carried out while water-cooling a substrate holder at 20° C. for film formation, while the substrate 10 was not heated.

(Inorganic Insulating Film 20)

The formation of the inorganic insulating film 20 was carried out with the following sputtering system and film formation conditions.

Sputtering System (manufactured by ANELVA COPORATION, C-3103)

Target Composition: SCZ ($SiO_2$ 35 at % (atomic percent)+$Cr_2O_3$ 30 at %+$ZrO_2$ 35 at %)

Target Size: Φ6 inches

Sputtering Gas: Ar100 sccm, 0.13 Pa

Sputtering Power: 1000 W (RF)
Film Thickness: 50 nm
(Positive Electrode Side Current Collector Film 30)

The formation of the positive electrode side current collector film 30 was carried out with the following sputtering system and film formation conditions.
Sputtering System (manufactured by ULVAC, Inc., Special Model SMO-01)
Target Composition: Ti
Target Size: Φ4 inches
Sputtering Gas: Ar70 sccm, 0.45 Pa
Sputtering Power: 1000 W(DC)
Film Thickness: 100 nm
(Positive Electrode Protective Film 31)

The formation of the positive electrode protective film 30 was carried out with the following sputtering system and film formation conditions.
Sputtering System (manufactured by ULVAC, Inc., Special Model SMO-01)
Target Composition: $LiCoO_2$
Target Size: Φ4 inches
Sputtering Gas: (Mixed Gas: Ar 80%+$O_2$ 20%) 20 sccm, 0.20 Pa
Sputtering Power: 300 W (RF)
Film Thickness: 10 nm
(Positive Electrode Active Material Film 40)

The formation of the positive electrode active material film was carried out with the following sputtering system and film formation conditions.
Sputtering System (manufactured by ULVAC, Inc., Special Model SMO-01)
Target Composition: Co-Sputtering of $Li_3PO_4$ and Cu
Target Size: Φ4 inches
Sputtering Gas: Ar (80%)+$O_2$ (20%) 20 sccm, 0.20 Pa
Sputtering Power: $Li_3PO_4$ 600 W (RF), Cu 50 W(DC)
Film Thickness: 300 nm
(Solid Electrolyte Film 50)

The formation of the solid electrolyte film 50 was carried out with the following sputtering system and film formation conditions.
Sputtering System (manufactured by ULVAC, Inc., Special Model SMO-01)
Target Composition: $Li_3PO_4$
Target Size: Φ4 inches
Sputtering Gas: Ar20 sccm+$N_2$20 sccm, 0.26 Pa
Sputtering Power: 600 W (RF)
Film Thickness: 500 nm
(Negative Electrode Potential Formation Layer 64)

The formation of the negative electrode potential formation layer 64 was carried out with the following sputtering system and film formation conditions.
Sputtering System (manufactured by ULVAC, Inc., Special Model SMO-01)
Target Composition: $LiCoO_2$
Target Size: Φ4 inches
Sputtering Gas: (Mixed Gas: Ar 80%+$O_2$ 20%) 20 sccm, 0.20 Pa
Sputtering Power: 300 W (RF)
Film Thickness: 10 nm
(Negative Electrode Side Current Collector Film 70)

The formation of the negative electrode side current collector film 70 was carried out with the following sputtering system and film formation conditions.
Sputtering System (manufactured by ULVAC, Inc., Special Model SMO-01)
Target Composition: Ti
Target Size: Φ4 inches
Sputtering Gas: Ar70 sccm, 0.45 Pa
Sputtering Power: 1000 W(DC)
Film Thickness: 200 nm Finally, the entirely protective film 80 was formed with the use of an ultraviolet curable resin (manufactured by Sony Chemical & Information Device Corporation, Model Number SK 3200), and an inorganic insulating film was further formed on the ultraviolet curable resin under the same film formation conditions as mentioned above. The solid electrolyte battery according to Example 1 was obtained as described above. More specifically, the solid electrolyte battery according to Example 1 was obtained which had the following film configuration. It is to be noted that size of the solid electrolyte battery was 1 cm×1 cm in terms of the area of the positive electrode active material film 40.
(Film Configuration of Solid Electrolyte Battery)

Polycarbonate Substrate/SCZ (50 nm)/Ti (100 nm)/$LiCoO_2$ (10 nm)/$Li_xCu_yPO_4$ (300 nm)/$Li_3PO_{4-x}N_x$ (500 nm)/$LiCoO_2$ (10 nm)/Ti (200 nm)/Ultraviolet Curable Resin (20 μm)/SCZ (50 nm)
(Composition Analysis by XPS)

The analysis of the positive electrode active material film 40 was carried out in the following way. The same type of single layer film (film thickness: 400 nm) as the positive electrode active material film 40 was formed on quartz glass under the same film formation conditions as the film formation conditions for the positive electrode active material film 40. Then, the composition analysis of the single layer film was carried out by X-ray photoelectron spectroscopy (XPS). As a result, the composition of the single layer film was $Li_{2.2}Cu_{2.5}PO_{4.0}$.
(TEM Analysis)

Figure 3:
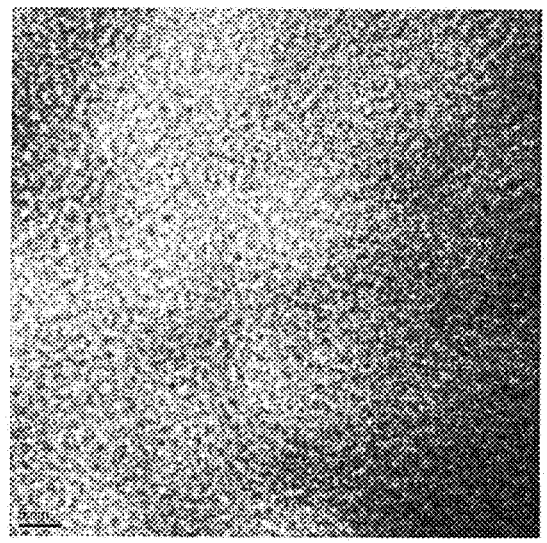
FIG. 3A shows a TEM image observed under a transmission electron microscope.
FIG. 3B shows an electron diffraction pattern.
Figure 3:
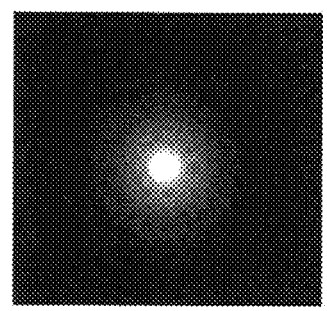

In addition, a cross section of this single layer film was observed by a transmission electron microscope (TEM). The measurement result is shown in FIG. 3. FIG. 3A shows a TEM image observed under the transmission electron microscope, and FIG. 3B shows an electron diffraction pattern.

Crystal grains are not confirmed in the TEM image as shown in FIG. 3A, and a halo ring indicating an amorphous state is observed in the electron diffraction pattern as shown in FIG. 3B. Thus, it has been confirmed that the positive electrode active material film 40 is amorphous.
(TEM Analysis of Positive Electrode Protective Film)

Figure 4:
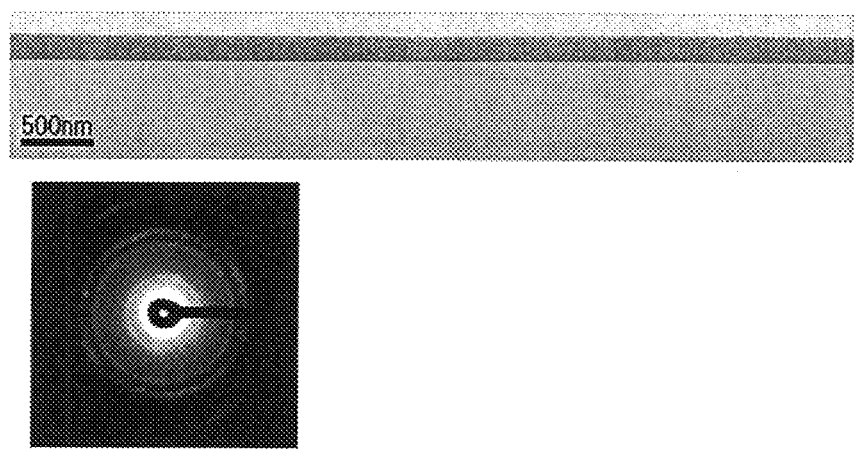
FIG. 4 is a TEM image and an electron diffraction pattern on a cross section of a positive electrode protective film according to Example 1.

As for the positive electrode protective film 31 ($LiCoO_2$ film), a crystalline peak was confirmed by XRD (X-ray diffraction), so that the presence of a crystalline structure was confirmed. In addition, the $LiCoO_2$ film was observed under a transmission electron microscope. FIG. 4 shows a TEM image and an electron diffraction pattern observed under a transmission electron microscope. As shown in FIG. 4, it can be confirmed that a microcrystalline structure is obviously present, because no anneal treatment was carried out after the sputter deposition.

Comparative Example 1

Prepared was a solid electrolyte battery configured to have polycarbonate substrate/SCZ (50 nm)/Ti (100 nm)/$Li_xCu_yPO_4$ (300 nm)/$Li_3PO_{4-x}N_x$ (500 nm)/$LiCoO_2$ (10 nm)/Ti (200 nm)/ultraviolet curable resin (20 μm)/SCZ (50 nm). More specifically, the solid electrolyte battery was prepared in the same way as in Example 1, except that the positive electrode protective film 31 was eliminated.
(Charge and Discharge Test)

Figure 5:
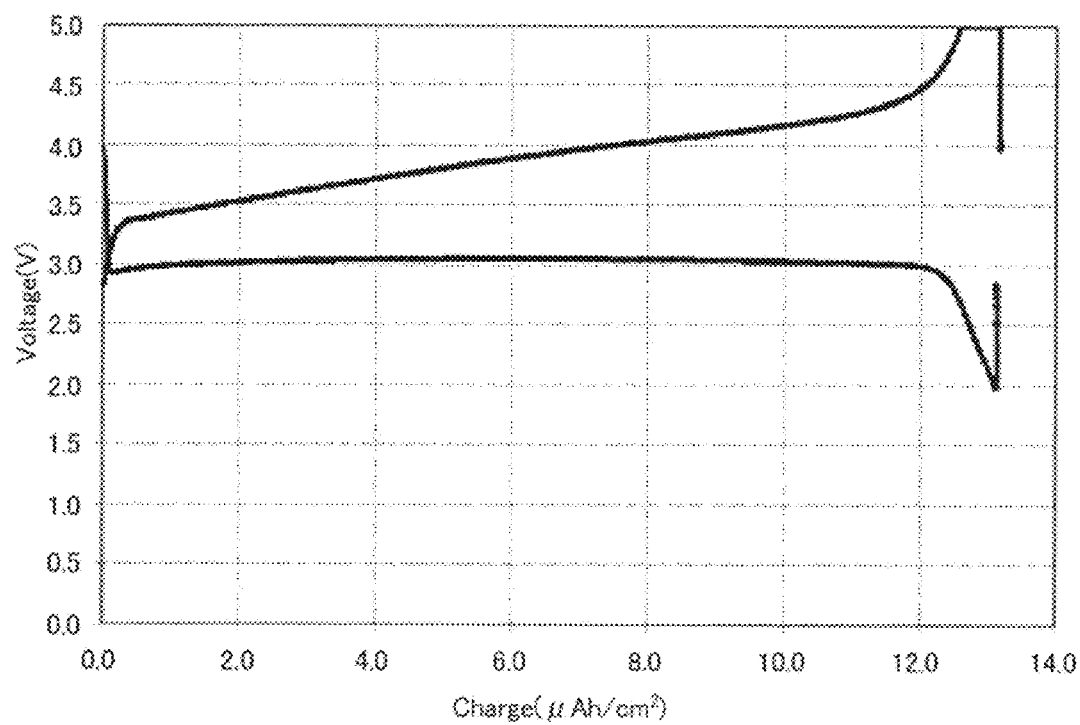
FIG. 5 is a graph showing a charging-discharging curve according to Example 1.
Figure 6:
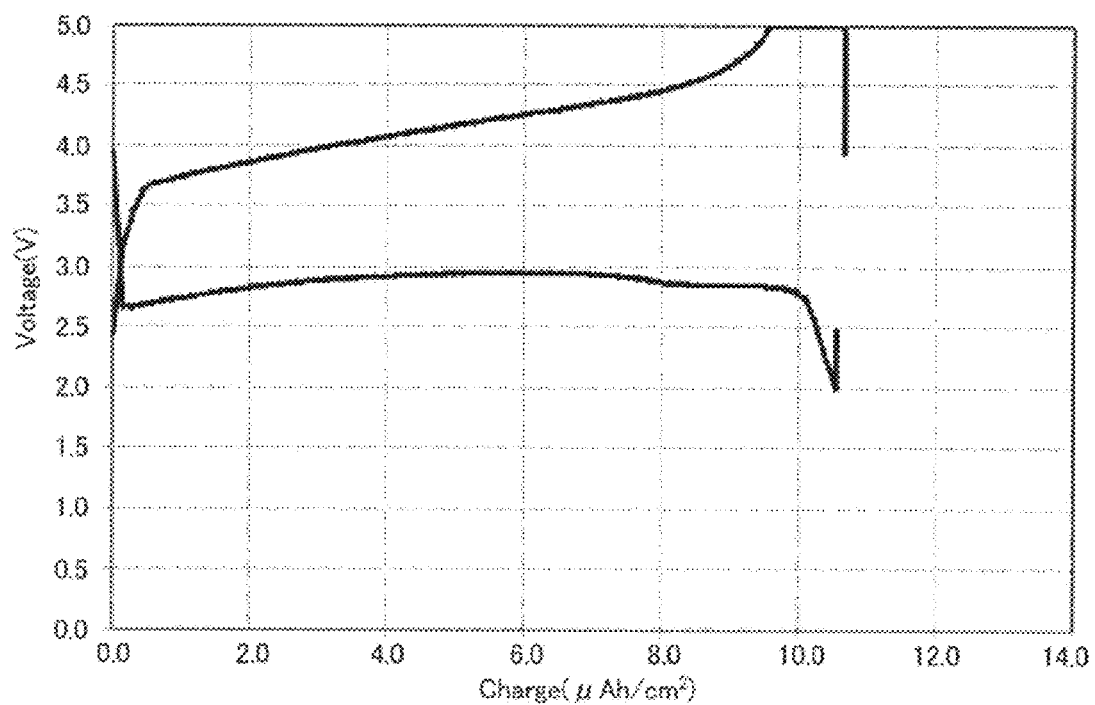
FIG. 6 is a graph showing a charging-discharging curve according to Comparative Example 1.

A charge and discharge test was carried out for the solid electrolyte batteries according to Example 1 and Comparative Example 1. The charge was carried out at a charging current of 50 µA and a charge cutoff voltage of 5 V. The discharge was carried out at a discharging current of 50 µA and a discharge cutoff voltage of 2 V. It is to be noted that the current of 50 µA corresponds to a charge-discharge rate of 4C (a current value for charging/discharging the theoretical capacity for 0.25 hours). The thus obtained charge-discharge characteristics of the solid electrolyte batteries are shown in FIGS. 5 and 6. It is to be noted that the charge-discharge curves shown in FIGS. 5 and 6 are the fifth-cycle charging-discharging curves after five cycles of charge and discharge.

As indicated by the charging-discharging curve according to Example 1 in FIG. 5, at this charge-discharge rate, favorable charge-discharge characteristics have been achieved, in which the discharge voltage is nearly flat at 3 V, whereas the charge voltage is increased from 3.4 V, and sharply increased on the order 4.3 V to complete the charging.

On the other hand, as indicated by the charging-discharging curve according to Comparative Example 1 in FIG. 6, at this charge-discharge rate, a voltage drop caused by impedance is confirmed with the discharge voltage below 3V, and moreover, an increased in charge voltage is confirmed with the charging voltage increased from 3.7 V and the potential increased just over 4.5 V. Furthermore, the charge-discharge capacity is decreased, because of failing to achieve ideal charging due to the high-impedance charging.

Thus, it has been demonstrated that the positive electrode protective film ($LiCoO_2$ film), in spite of the thickness of just 10 nm, substantially reduces the impedance. This is believed to be due to interface control or the like at the surface of the positive electrode side current collector film composed of a metal.

When the positive electrode is composed of a positive electrode active material film composed of an amorphous positive electrode active material such as $Li_{2.2}Cu_{2.5}PO_{4.0}$; and the positive electrode side current collector film, the impedance will be increased. In contrast, the positive electrode active material of oxide such as $LiCoO_2$, formed likewise by sputter deposition, is placed at the interface between the positive electrode active material film and the positive electrode side current collector film to suppress the increase in impedance. For the positive electrode active material of oxide, a crystalline or microcrystalline material property is proven to be effective. Further, it is obvious from the foregoing that it is also effective as in the case of the $LiCoO_2$ film to use, as the positive electrode protective film, $LiMn_2O_4$, $LiNiO_2$, or the like that is a positive electrode active material of oxide similar to $LiCoO_2$.

Example 2

Prepared was a solid electrolyte battery configured to have polycarbonate substrate/SCZ (50 nm)/Ti (100 nm)/$LiMn_2O_4$ (5 nm)/$Li_xCu_yPO_4$ (1000 nm)/$Li_3PO_{4-x}N_x$ (500 nm)/$LiMn_2O_4$ (5 nm)/Ti (200 nm)/ultraviolet curable resin (20 µm)/SCZ (50 nm). More specifically, the solid electrolyte battery was prepared in the same way as in Example 1, except that the film thickness of the positive electrode active material was adjusted to 1000 nm, and that the positive electrode protective film 31 and the negative electrode potential formation film 64 were formed under the following film formation conditions.
(Positive Electrode Protective Film 31)
The formation of the positive electrode protective film 31 was carried out with the following sputtering system and film formation conditions.

Figure 7:
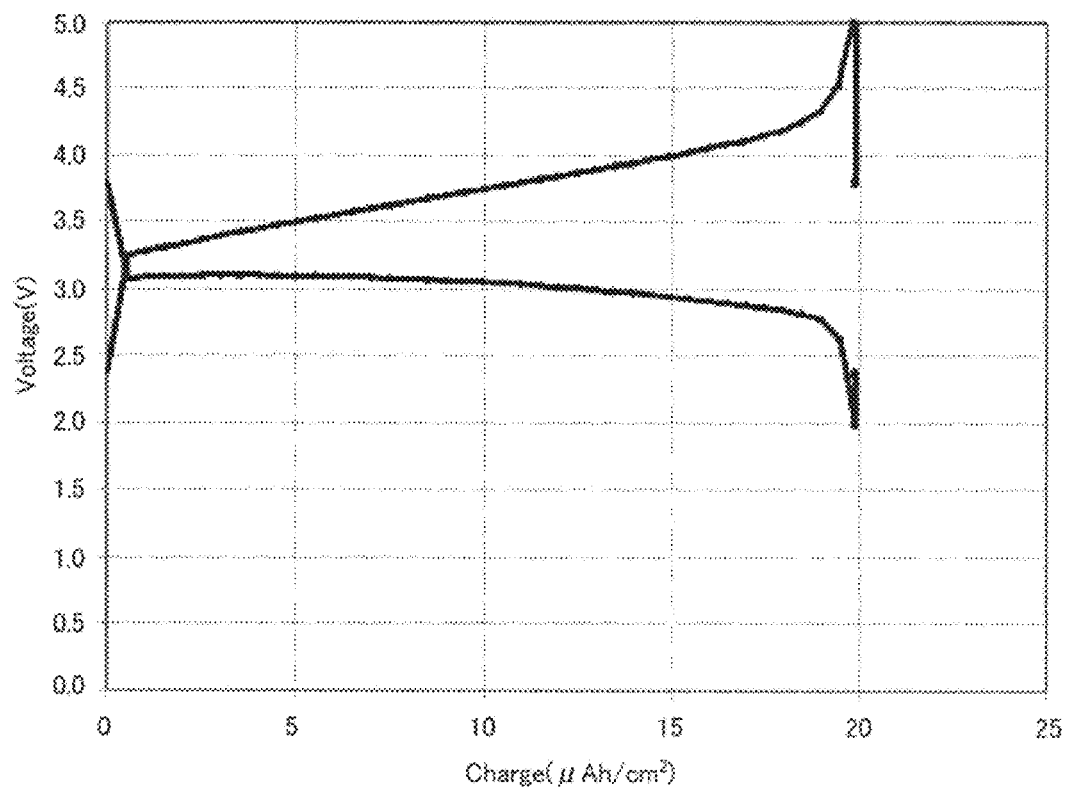
FIG. 7 is a graph showing a charging-discharging curve according to Example 2.

Sputtering System (manufactured by ULVAC, Inc., Special Model SMO-01)
Target Composition: $LiMn_2O_4$
Target Size: Φ4 inches
Sputtering Gas: (Mixed Gas: Ar 80%+$O_2$ 20%) 20 sccm, 0.20 Pa
Sputtering Power: 300 W (RF)
Film Thickness: 5 nm
(Negative Electrode Potential Formation Film)
The formation of the negative electrode battery formation layer 64 was carried out with the following sputtering system and film formation conditions.
Sputtering System (manufactured by ULVAC, Inc., Special Model SMO-01)
Target Composition: $LiMn_2O_4$
Target Size: Φ4 inches
Sputtering Gas: (Mixed Gas: Ar 80%+$O_2$ 20%) 20 sccm, 0.20 Pa
Sputtering Power: 300 W (RF)
Film Thickness: 5 nm
(Charge and Discharge Test)
A charge and discharge test was carried out for the solid electrolyte battery according to Example 2 in the same way as in Example 1. FIG. 7 shows a charging-discharging curve for the solid electrolyte battery according to Example 2.

As shown in FIG. 7, even in the case of the $LiMn_2O_4$ film in place of the $LiCoO_2$ film for the positive electrode protective film 31, the effect of reduced impedance can be confirmed as in the case of the $LiCoO_2$ film for the positive electrode protective film 31 (Example 1). In addition, it can be determined that the effect of reduced impedance is obtained from the positive electrode protective film 31, because Example 2 achieves the same level of charge/discharge voltage as in Example 1, in spite of the positive electrode active material film 40 which is three or more times as thick as that in Example 1.

Reference Example 1-1 to Reference Example 1-3

In Reference Example 1-1 to Reference Example 1-3 below, specific examples of a novel amorphous positive electrode active material that functions as a positive electrode active material will be described.

Reference Example 1-1

Prepared was a solid electrolyte battery structured with the positive electrode protective film 31 omitted in the configuration shown in FIG. 1. A polycarbonate (PC) substrate of 1.1 mm in thickness was used as the substrate 10. SCZ ($SiO_2$—$Cr_2O_3$—$ZrO_2$) was deposited as the inorganic insulating film 20 on the substrate 10.

A metal mask is placed on the inorganic insulating film 20, and in a predetermined areas, as the positive electrode side current collector film 30, the positive electrode active material film 40, the solid electrolyte film 50, the negative electrode potential formation layer 64, and the negative electrode side current collector film 70 were sequentially formed to form a stacked body. A Ti film, a $Li_xCu_yPO_4$ film, a $Li_3PO_{4-x}N_x$ film, a $LiCoO_2$ film, and a Ti film were respectively formed as the positive electrode side current collector film 30, the positive electrode active material film 40, the solid electrolyte film 50, the negative electrode potential formation layer 64, and the negative electrode side current collector film 70.

Figure 8:
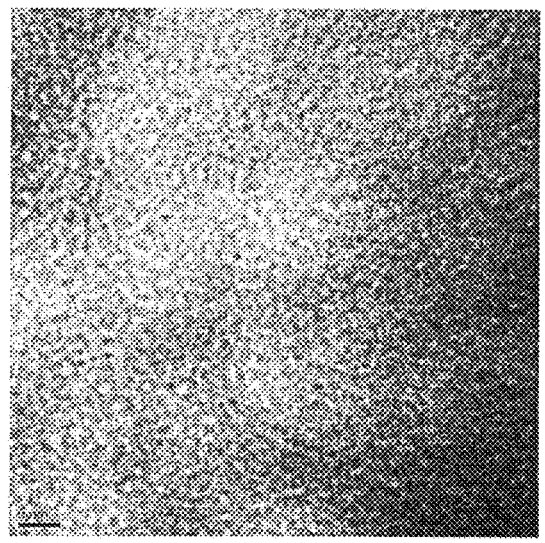
FIG. 8A shows a TEM image observed under a transmission electron microscope.
Figure 8:
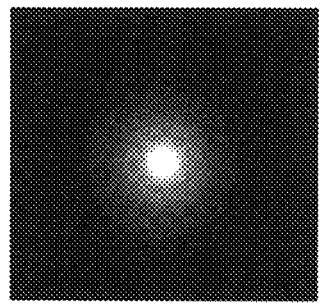
Figure 9:
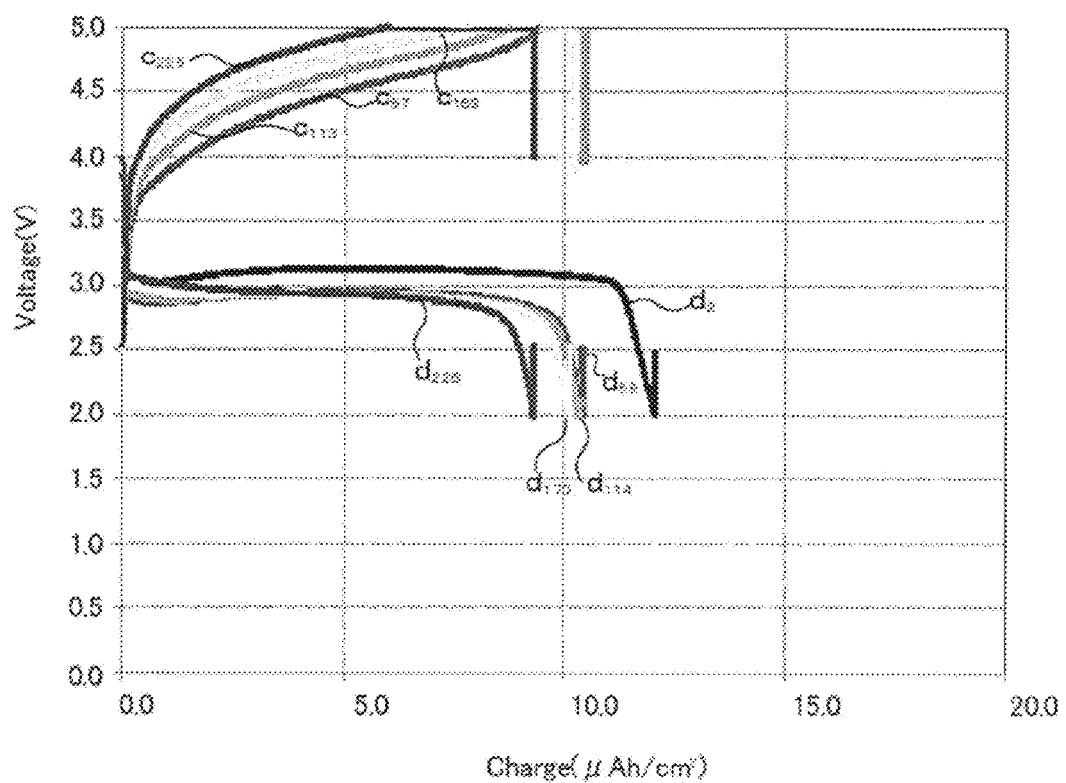
FIG. 9 is a graph showing a charging-discharging curve according to Reference Example 1-1.

The conditions for forming the respective thin films constituting the inorganic insulating film 20 and the stacked body were made as follows. It is to be noted that the film formation was carried out while water-cooling a substrate holder at 20° C. for film formation, while the substrate 10 was not heated.
(Inorganic Insulating Film 20)
The formation of the inorganic insulating film 20 was carried out with the following sputtering system and film formation conditions.
Sputtering System (manufactured by ANELVA COPORATION, C-3103)
Target Composition: SCZ ($SiO_2$ 35 at % (atomic percent)+ $Cr_2O_3$ 30 at %+$ZrO_2$ 35 at %)
Target Size: Φ6 inches
Sputtering Gas: Ar100 sccm, 0.13 Pa
Sputtering Power: 1000 W (RF)
(Positive Electrode Side Current Collector Film 30)
The formation of the positive electrode side current collector film 30 was carried out with the following sputtering system and film formation conditions.
Sputtering System (manufactured by ULVAC, Inc., Special Model SMO-01)
Target Composition: Ti
Target Size: Φ4 inches
Sputtering Gas: Ar70 sccm, 0.45 Pa
Sputtering Power: 1000 W(DC)
Film Thickness: 100 nm
(Positive Electrode Active Material Film 40)
The formation of the positive electrode active material film was carried out with the following sputtering system and film formation conditions.
Sputtering System (manufactured by ULVAC, Inc., Special Model SMO-01)
Target Composition: Co-Sputtering of $Li_3PO_4$ and Cu
Target Size: Φ4 inches
Sputtering Gas: Ar (80%)+$O_2$ (20%) 20 sccm, 0.20 Pa
Sputtering Power: $Li_3PO_4$ 600 W (RF), Cu50 W(DC)
Film Thickness: 350 nm
(Solid Electrolyte Film 50)
The formation of the solid electrolyte film 50 was carried out with the following sputtering system and film formation conditions.
Sputtering System (manufactured by ULVAC, Inc., Special Model SMO-01)
Target Composition: $Li_3PO_4$
Target Size: Φ4 inches
Sputtering Gas: Ar20 sccm+$N_2$20 sccm, 0.26 Pa
Sputtering Power: 600 W (RF)
Film Thickness: 400 nm
(Negative Electrode Potential Formation Layer 64)
The formation of the negative electrode potential formation layer 64 was carried out with the following sputtering system and film formation conditions.
Sputtering System (manufactured by ULVAC, Inc., Special Model SMO-01)
Target Composition: $LiCoO_2$
Target Size: Φ4 inches
Sputtering Gas: (Mixed Gas: Ar 80%+$O_2$ 20%) 20 sccm, 0.20 Pa
Sputtering Power: 300 W (RF)
Film Thickness: 10 nm
(Negative Electrode Side Current Collector Film 70)
The formation of the negative electrode side current collector film 70 was carried out with the following sputtering system and film formation conditions.
Sputtering System (manufactured by ULVAC, Inc., Special Model SMO-01)
Target Composition: Ti
Target Size: Φ4 inches
Sputtering Gas: Ar70 sccm, 0.45 Pa Sputtering Power: 1000 W(DC)
Film Thickness: 200 nm
Finally, the entirely protective film 80 was formed with the use of an ultraviolet curable resin (manufactured by Sony Chemical & Information Device Corporation, Model Number SK 3200), and an inorganic insulating film was further formed on the ultraviolet curable resin under the same film formation conditions as mentioned above. The solid electrolyte battery according to Reference Example 1-1 was obtained as described above. More specifically, the solid electrolyte battery according to Reference Example 1-1 was obtained which had the following film configuration.
(Film Configuration of Solid Electrolyte Battery)
Polycarbonate Substrate/SCZ (50 nm)/Ti (100 nm)/$Li_xCu_yPO_4$ (350 nm)/$Li_3PO_{4-x}N_x$ (400 nm)/$LiCoO_2$ (10 nm)/Ti (200 nm)/Ultraviolet Curable Resin (20 μm)/SCZ (50 nm)
[Analysis of Positive Electrode Active Material Film 40]
(XPS Analysis)
The analysis of the positive electrode active material film 40 was carried out in the following way. The same type of single layer film as the positive electrode active material film 40 was formed on quartz glass under the same film formation conditions as the film formation conditions for the positive electrode active material film 40. Then, the composition analysis of the single layer film was carried out by X-ray photoelectron spectroscopy (XPS). As a result, the composition of the single layer film was $Li_{2.2}Cu_{2.2}PO_{4.0}$.
(TEM Analysis)
In addition, a cross section of this single layer film was observed by a transmission electron microscope (TEM). The measurement result is shown in FIG. 8. FIG. 8A shows a TEM image observed under the transmission electron microscope, and FIG. 8B shows an electron diffraction pattern.
Crystal grains are not confirmed in the TEM image as shown in FIG. 8A, and a halo ring indicating an amorphous state is observed in the electron diffraction pattern as shown in FIG. 8B. Thus, it has been confirmed that the positive electrode active material film 40 is amorphous.
(Charge and Discharge Test)
A charge and discharge test was carried out for the solid electrolyte battery according to Reference Example 1-1. The charge was carried out at a charging current of 50 μA and a charge cutoff voltage of 5 V. The discharge was carried out at a discharging current of 50 μA and a discharge cutoff voltage of 2 V. It is to be noted that the current of 50 μA corresponds to 5C (a current value for charging/discharging the theoretical capacity for 0.2 hours). FIG. 9 shows the measurement result. It is to be noted that a line $c_x$ indicates a charging curve in FIG. 9. The subscript x is an odd number, and the line $c_x$ indicates the charging curve in the "(x+1)/2"-th charging. A line $d_y$ indicates a discharging curve. The subscript y is an even number, and the line $d_y$ indicates the discharging curve in the "y/2"-th discharging after the initial charging (the same applies to FIGS. 10 and 12 below).
As shown in FIG. 9, the solid electrolyte battery according to Reference Example 1-1 is excellent in discharge potential plateau around 3 V. In addition, this positive electrode active material also exhibited favorable characteristics against repeated charge and discharge.

Reference Example 1-2

A solid electrolyte battery according to Reference Example 1-2 was prepared in the same way as in Reference Example 1-1, except that the positive electrode active material film 40 was formed under the following film formation conditions.

[Positive Electrode Active Material Film 40]

On the positive electrode side current collector film 30, the positive electrode active material film 40 was formed under the following film formation conditions.

Sputtering System (manufactured by ULVAC, Inc., Special Model SMO-01)
Target Composition: Co-Sputtering of $Li_3PO_4$ and Cu
Target Size: Φ4 inches
Sputtering Gas: Ar (80%)+$O_2$ (20%) 20 sccm, 0.20 Pa
Sputtering Power: $Li_3PO_4$ 600 W (RF), Cu 70 W(DC)
Film Thickness: 370 nm

[Analysis of Positive Electrode Active Material Film 40]
(XPS Analysis)

A composition analysis was carried out by X-ray photoelectron spectroscopy (XPS), in the same way as in Reference Example 1-1. As a result, the same type of single layer film as the positive electrode active material film 40 was $Li_{2.2}Cu_{3.3}PO_{4.0}$ in composition.

(TEM Analysis)

In addition, the observation of this single layer film under a transmission microscope (TEM) confirmed no crystal grains in the TEM image, and found a halo ring indicating an amorphous state in the electron diffraction pattern as in Reference Example 1-1. Thus, it has been confirmed that the positive electrode active material film 40 is amorphous.

(Charge and Discharge Test)

A charge and discharge test was carried out in the same way as in Reference Example 1-1. The measurement result is shown in FIG. 10.

Figure 10:
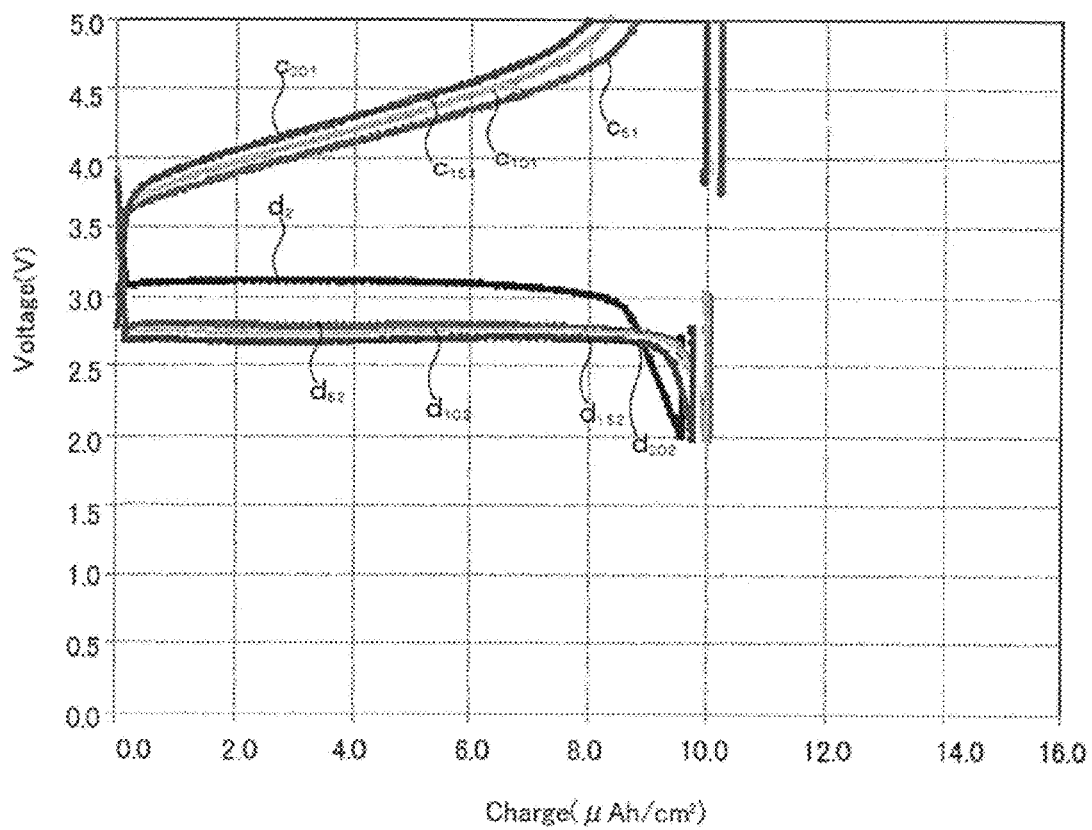
FIG. 10 is a graph showing a charging-discharging curve according to Reference Example 1-2.

As shown in FIG. 10, the solid electrolyte battery according to Reference Example 1-2 is excellent in discharge potential plateau around 3 V. In addition, this positive electrode active material also exhibited favorable characteristics against repeated charge and discharge.

(Consideration of Lithium Composition Ratio x)

The lithium composition ratio x in full charge is found to be 1.0, when a calculation is made based on the discharge capacity and the film composition of the positive electrode active material 40. As shown in FIGS. 9 and 10, with the progress of charging, the lithium composition ratio x is decreased from the composition ratio at the film formation, and when the ratio is decreased down to a value around x=1.0, the impedance is increased to increase for the charging voltage, thereby completing the charging. Thus, it is determined that if the composition ratio x of lithium in the $Li_xCu_yPO_4$ constituting the positive electrode active material film 40 is less than 1.0 after the formation of the positive electrode active material film 40 (before charging), the excessively high impedance will fail to progress discharging, thus resulting in a failure to function as a battery. Therefore, it is determined that the composition ratio x of lithium in the $Li_xCu_yPO_4$ constituting the positive electrode active material film 40 is preferably 1.0 or more. However, x is preferably larger than 1 in terms of battery capacity, because the ratio x=1 before the start of charging results in a failure to function as a battery.

It can be confirmed that the battery is driven up to x=3, as the composition ratio x of lithium in the $Li_xCu_yPO_4$ constituting the positive electrode active material film 40. The $Li_xCu_yPO_4$ with the lithium composition ratio x higher than 3 is able to be achieved by increasing the composition of Li in the sputter target. When the change in potential was measured for a sample prepared to be able to have Li externally inserted into the positive electrode active material $Li_{2.2}Cu_{3.3}PO_4$ according to Reference Example 1-2, the battery including the positive electrode active material up to the composition with x=4.5 fell within the change in potential of 2 V or less from the beginning. Thus, it is determined that the $Li_xCu_yPO_4$ can function up to the upper limit 4.5 of the lithium composition ratio x, and the lithium composition ratio x is thus preferably x≤4.5.

Test Examples

A plurality of samples (solid electrolyte batteries) was prepared with the varying composition ratio y of copper in $Li_xCu_yPO_4$ constituting the positive electrode active material film 40, and the charge-discharge capacity was measured for these samples.

The same configuration as in Reference Example 1-1 was adopted for the film configurations of the samples. More specifically, adopted was the polycarbonate substrate/SCZ (50 nm)/Ti (100 nm)/$Li_xCu_yPO_4$ (350 nm)/$Li_3PO_4N_x$ (400 nm)/$LiCoO_2$ (10 nm)/Ti (200 nm)/Ultraviolet Curable Resin (20 μm)/SCZ (50 nm).

For each sample, the sputtering power was appropriately varied among the film formation conditions for the positive electrode active material film 40 to prepare a plurality of samples each with the varying composition ratio y of copper in $Li_xCu_yPO_4$ constituting the positive electrode active material film 40. For each of the plurality of samples prepared, the samples were charged and discharged under the same conditions as in Reference Example 1-1, and the charge-discharge capacity in this case was obtained for each sample. The measurement results are shown in FIG. 11.

Figure 11:
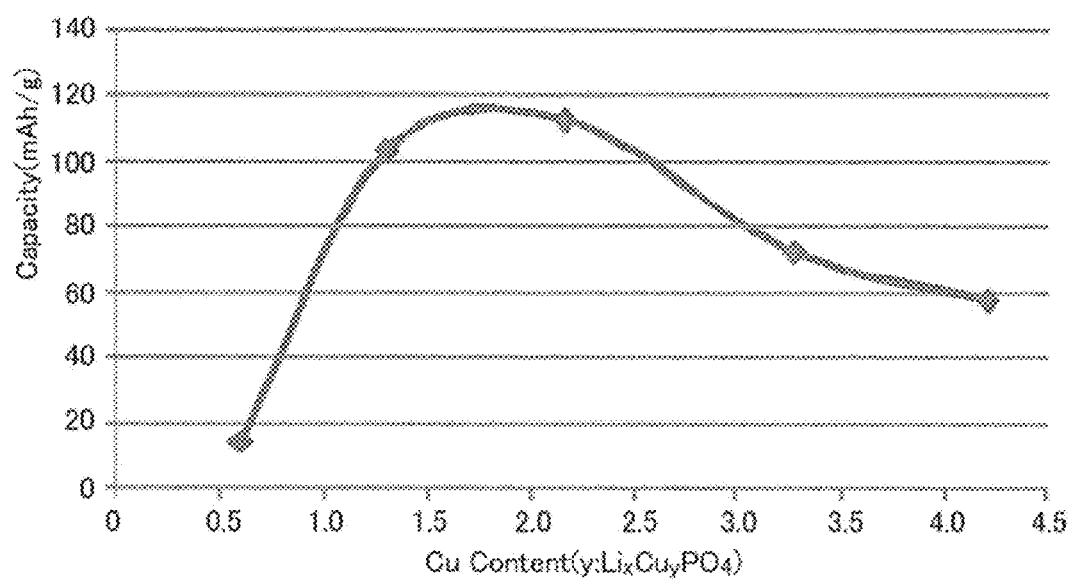
FIG. 11 is a graph showing measurement results of test examples.

As shown in FIG. 11, when the composition ratio y of copper in the $Li_xCu_yPO_4$ constituting the positive electrode active material film 40 is less than 1.0, the capacity is drastically decreased. Therefore, it can be confirmed that the composition ratio y of copper in the $Li_xCu_yPO_4$ constituting the positive electrode active material film 40 is preferably 1.0 or more. In addition, the capacity is increased at the composition ratio y of copper from 1.0 to 2.2, and the capacity per unit weight is decreased over around 2.2. This is because the increased composition ratio y of copper in the positive electrode active material increased the weight density, whereas the composition ratio x of the containable lithium was decreased. In addition, when the composition ratio y of copper is greater than 4.0, the capacity is decreased to the at most half of the capacity at the copper composition ratio y=2.2 which can achieve the maximum capacity. It has been determined from the foregoing that the composition ratio y of copper in the $Li_xCuP_yO_4$ is preferably 1.0≤y≤4.0.

Reference Example 1-3

A solid electrolyte battery according to Reference Example 1-3 was prepared in the same way as in Reference Example 1-1, except that the positive electrode active material film 40 was formed under the following film formation conditions.

[Positive Electrode Active Material Film 40]

The formation of the positive electrode active material film 40 was carried out with the following sputtering system and film formation conditions.

Sputtering System (manufactured by ULVAC, Inc., Special Model SMO-01)
Target Composition: Co-Sputtering of $Li_3PO_4$ and Cu
Target Size: Φ4 inches
Sputtering Gas: Ar (80%)+$O_2$ (20%) 20 sccm, 0.20 Pa
Sputtering Power: $Li_3PO_4$ 600 W (RF), Cu 40 W(DC)
Film Thickness: 270 nm

[Analysis of Positive Electrode Active Material Film 40]
(XPS Analysis)

A composition analysis was carried out by X-ray photoelectron spectroscopy (XPS), in the same way as in Reference Example 1-1. As a result, the same type of single layer film as the positive electrode active material film 40 was $Li_{2.2}Cu_{1.3}PO_{4.0}$ in composition.

(Charge and Discharge Test)

A charge and discharge test was carried out in the same way as in Reference Example 1-1. The measurement result is shown in FIG. 12.

Figure 12:
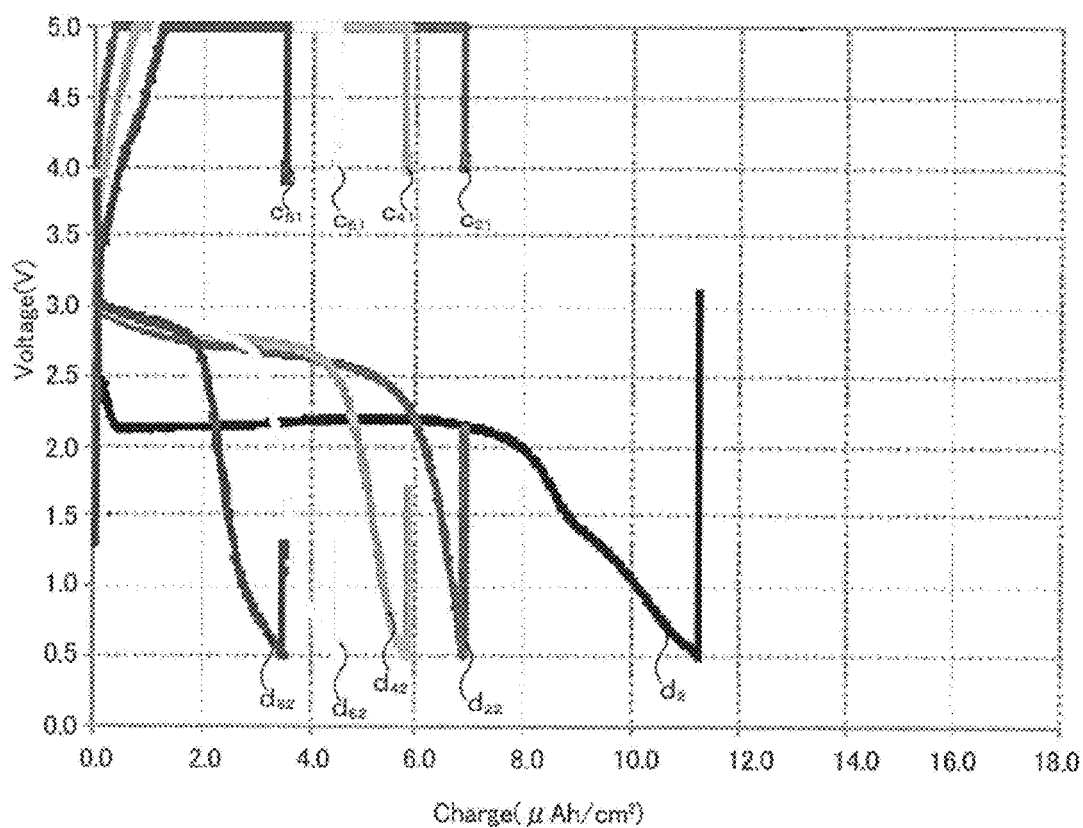
FIG. 12 is a graph showing a charging-discharging curve according to Reference Example 1-3.

As shown in FIG. 12, the solid electrolyte battery according to Reference Example 1-3 exhibited a favorable initial charge-discharge behavior, but poor durability against repeated charge and discharge (charge-discharge cycle characteristics), with the battery capacity decreased to the half or less by the repetition several tens of times. More specifically, the charge-discharge cycle characteristics were degraded when the composition ratio y of copper in the $Li_xCu_yPO_4$ constituting the positive electrode active material film 40 was 1.3 as in Reference Example 1-3. On the other hand, when the composition ratio y of copper in the $Li_xCu_yPO_4$ constituting the positive electrode active material film 40 was 2.2 as in Reference Example 1-3 described above, charge and discharge were possible 100 times or more (see FIG. 9). Therefore, in terms of charge-discharge cycle characteristics, it has been determined that the composition ratio y of copper in the $Li_xCu_yPO_4$ constituting the positive electrode active material film 40 is more preferably 2.2≤y.

Reference Example 2-1 to Reference Example 2-6,
Reference Example 3-1 to Reference Example 3-10

In addition, in Reference Example 2-1 to Reference Example 2-6, specific examples of a novel amorphous positive electrode active material that functions as a positive electrode active material will be described. It is to be noted that Reference Example 3-1 to Reference Example 3-10 are comparative examples corresponding to Reference Example 2-1 to Reference Example 2-6.

Reference Example 2-1

Prepared was a solid electrolyte battery structured with the positive electrode protective film 31 omitted in the configuration shown in FIG. 1. A polycarbonate (PC) substrate of 1.1 mm in thickness was used as the substrate 10. SiN was deposited as the inorganic insulating film 20 on the substrate 10.

A metal mask is placed on the inorganic insulating film 20, and in a predetermined areas, the positive electrode side current collector film 30, the positive electrode active material film 40, the solid electrolyte film 50, the negative electrode potential formation layer 64, and the negative electrode side current collector film 70 were sequentially formed to form a stacked body. Specifically a Ti film, a $Li_xNi_yPO_z$ film, a $Li_3PO_{4-x}N_x$ film, $LiCoO_2$ film, and a Ti film were respectively formed as the positive electrode side current collector film 30, the positive electrode active material film 40, the solid electrolyte film 50, the negative electrode potential formation layer 64, and the negative electrode side current collector film 70.

The conditions for forming the respective thin films constituting the inorganic insulating film 20 and the stacked body were made as follows. It is to be noted that the film formation was carried out, while the substrate 10 was not heated.

(Inorganic Insulating Film 20)

The formation of the inorganic insulating film 20 was carried out with the following sputtering system and film formation conditions.
Sputtering System (manufactured by ANELVA COPORATION, C-3103)
Target Composition: Si
Target Size: (136 inches
Sputtering Gas: Ar60 sccm, $N_2$ 30 sccm, 0.11 Pa
Sputtering Power: 1500 W(DC)

(Positive Electrode Side Current Collector Film 30)

The formation of the positive electrode side current collector film 30 was carried out with the following sputtering system and film formation conditions.
Sputtering System (manufactured by ULVAC, Inc., Special Model SMO-01)
Target Composition: Ti
Target Size: Φ4 inches
Sputtering Gas: Ar70 sccm, 0.45 Pa
Sputtering Power: 1000 W(DC)
Film Thickness: 100 nm (Positive Electrode Active Material Film 40)

The formation of the positive electrode active material film was carried out with the following sputtering system and film formation conditions.
Sputtering System (manufactured by ULVAC, Inc., Special Model SMO-01)
Target Composition: Co-Sputtering of $Li_3PO_4$ and Ni
Target Size: Φ4 inches
Sputtering Gas: Ar (80%)+$O_2$ (20%) 20 sccm, 0.20 Pa
Sputtering Power: $Li_3PO_4$ 600 W (RF), Ni150 W(DC)
Film Thickness: 340 nm (Solid Electrolyte Film 50)

The formation of the solid electrolyte film 50 was carried out with the following sputtering system and film formation conditions.
Sputtering System (manufactured by ULVAC, Inc., Special Model SMO-01)
Target Composition: $Li_3PO_4$
Target Size: Φ4 inches
Sputtering Gas: Ar20 sccm+$N_2$ 20 sccm, 0.26 Pa
Sputtering Power: 600 W (RF)
Film Thickness: 400 nm (Negative Electrode Potential Formation Layer 64)

The formation of the negative electrode potential formation layer 64 was carried out with the following sputtering system and film formation conditions.
Sputtering System (manufactured by ULVAC, Inc., Special Model SMO-01)
Target Composition: $LiCoO_2$
Target Size: Φ4 inches
Sputtering Gas: (Mixed Gas: Ar 80%+$O_2$ 20%) 20 sccm, 0.20 Pa
Sputtering Power: 300 W (RF)
Film Thickness: 10 nm (Negative Electrode Side Current Collector Film 70)

The formation of the negative electrode side current collector film 70 was carried out with the following sputtering system and film formation conditions.
Sputtering System (manufactured by ULVAC, Inc., Special Model SMO-01)
Target Composition: Ni
Target Size: Φ4 inches
Sputtering Gas: Ar70 sccm, 0.45 Pa
Sputtering Power: 1000 W(DC)
Film Thickness: 200 nm Finally, the entirely protective film 80 was formed with the use of an ultraviolet curable resin (manufactured by Sony Chemical & Information Device Corporation, Model Number SK 3200), and an inorganic insulating film was further formed on the entirely protective film 80. The solid electrolyte battery according to Reference Example 2-1 was obtained as described above. More specifically, the solid electrolyte battery according to Reference Example 2-1 was obtained which had the following film configuration.

(Film Configuration of Solid Electrolyte Battery)

Polycarbonate Substrate/SiN (50 nm)/Ti (100 nm)/$Li_xNi_y$-$PO_z$(340 nm)/$Li_3PO_{4-x}N_x$ (400 nm)/$LiCoO_2$ (10 nm)/Ni (200 nm)/Ultraviolet Curable Resin (20 μm)/SiN (50 nm)

[Analysis of Positive Electrode Active Material Film 40]

(XPS Analysis)

The analysis of the positive electrode active material film 40 was carried out in the following way. The same type of single layer film as the positive electrode active material film 40 was formed on quartz glass under the same film formation conditions as the film formation conditions for the positive electrode active material film 40. Then, the composition analysis of the single layer film was carried out by X-ray photoelectron spectroscopy (XPS). As a result, the composition of the single layer film was $Li_{2.2}Ni_{4.3}PO_7$.

(XRD Analysis)

No clear peak was obtained from the XRD analysis, indicating that the crystallinity was not high. This material is considered amorphous, because the production method is almost the same as in Reference Example 1-1.

(TEM Analysis)

In addition, the observation of this single layer film under a transmission microscope (TEM) confirmed no crystal grains in the TEM image, and found a halo ring indicating an amorphous state in the electron diffraction pattern as in Reference Example 1-1. Thus, it has been confirmed that the positive electrode active material film 40 is amorphous.

(Charge and Discharge Test)

Figure 13:
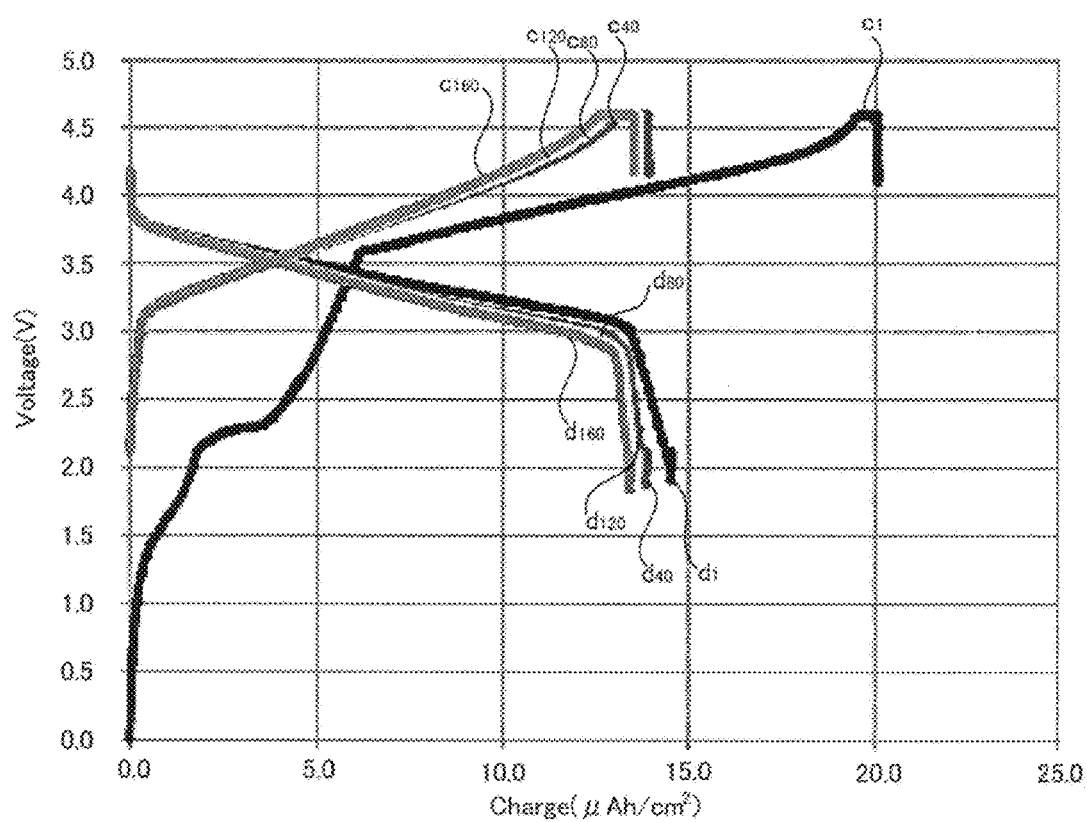
FIG. 13 is a graph showing a charging-discharging curve according to Reference Example 2-1.

A charge and discharge test was carried out for the solid electrolyte battery according to Reference Example 2-1. The charge was carried out at a charging current of 50 μA and a charge cutoff voltage of 4.6 V. The discharge was carried out at a discharging current of 50 μA and a discharge cutoff voltage of 2 V. It is to be noted that the current of 50 μA corresponds to 6C (a current value for charging/discharging the theoretical capacity for 0.1 hours). FIG. 13 shows the measurement result. It is to be noted that a line cn indicates a charging curve in FIG. 13. The subscript n indicates that the line cn refers to the charging curve in the n-th charging. A line dx indicates a discharging curve. The subscript k indicates that the line dk refers to the discharging curve in the k-th discharging after the initial charging (the same applies to FIGS. 14 to 15 below).

As shown in FIG. 13, the solid electrolyte battery according to Reference Example 2-1 is excellent in terms of linear change in potential at the potential of 3 V or more, and this positive electrode active material exhibited favorable characteristics against repeated charge and discharge.

Reference Example 2-2

A solid electrolyte battery was prepared in the same way as in Reference Example 1-1, except that the positive electrode active material film 40 was formed under the following film formation conditions.

(Positive Electrode Active Material Film 40)

The formation of the positive electrode active material film 40 was carried out with the following sputtering system and film formation conditions.

Sputtering System (manufactured by ULVAC, Inc., Special Model SMO-01)
Target Composition: Co-Sputtering of $Li_3PO_4$ and Mn
Target Size: Φ4 inches
Sputtering Gas: Ar (80%)+$O_2$ (20%) 20 sccm, 0.20 Pa
Sputtering Power: $Li_3PO_4$ 600 W (RF), Mn 200 W(DC)
Film Thickness: 320 nm The composition of Mn in $Li_xMn_yPO_z$ is comparable to the composition of Cu in the $Li_{2.2}Cu_{2.2}PO_{4.0}$ according to Reference Example 1-1. The sputter rates of the positive electrode active materials according to Reference Example 1-1 and Reference Example 2-2 are nearly equal to each other.

(Charge and Discharge Test)

In the same way as in Reference Example 2-1, a charge and discharge test was carried out for the solid electrolyte battery according to Reference Example 2-2. The measurement result is shown in FIG. 14.

Figure 14:
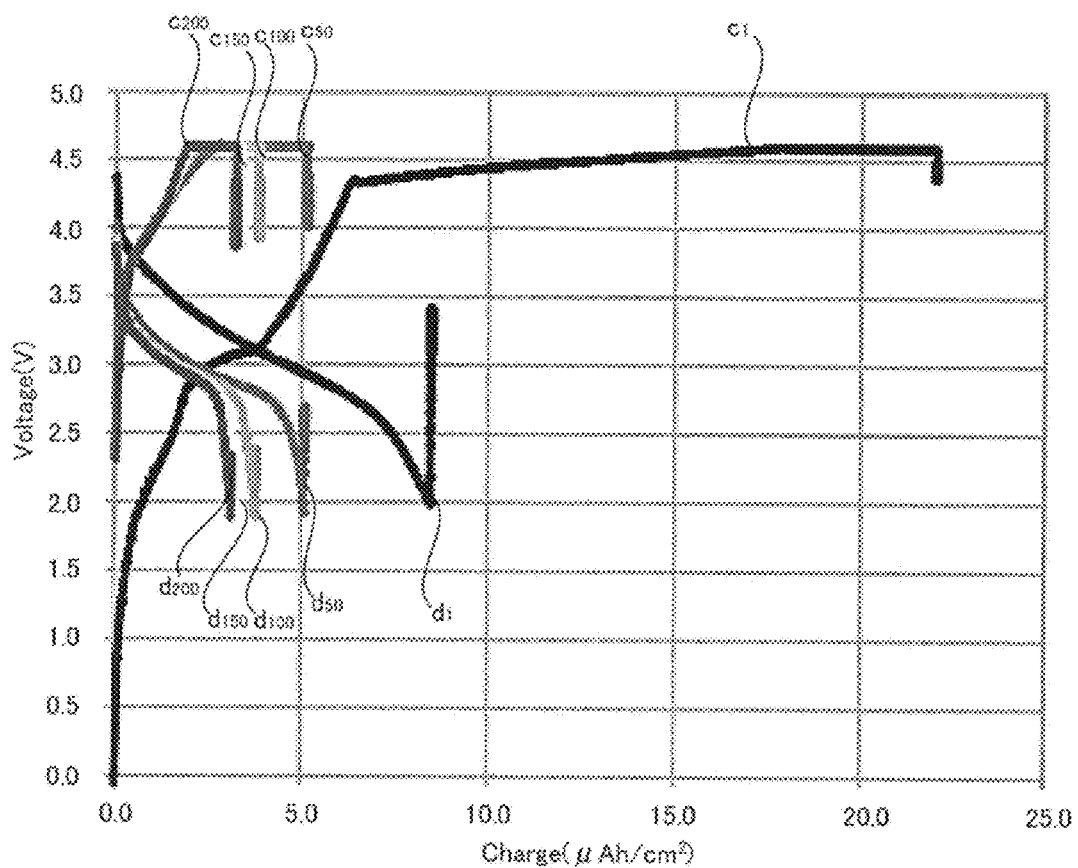
FIG. 14 is a graph showing a charging-discharging curve according to Reference Example 2-2.

As shown in FIG. 14, charge and discharge potentials are obtained, and it has been demonstrated that the $Li_xMn_yPO_z$ functions as a positive electrode active material. The durability against repeated charge and discharge is not able to be considered high because the potentials are decreased by the repeated charge and discharge, while the buttery is suitable for use in charge and discharge several times.

Reference Example 2-3

A solid electrolyte battery was prepared in the same way as in Reference Example 2-1, except that the positive electrode active material film 40 was formed under the following film formation conditions.

(Positive Electrode Active Material Film)

The formation of the positive electrode active material film was carried out with the following sputtering system and film formation conditions.

Sputtering System (manufactured by ULVAC, Inc., Special Model SMO-01)
Target Composition: Co-Sputtering of $Li_3PO_4$ and Ag
Target Size: Φ4 inches
Sputtering Gas: Ar (80%)+$O_2$ (20%) 20 sccm, 0.20 Pa
Sputtering Power: $Li_3PO_4$ 600 W (RF), Ag 35 W(DC)
Film Thickness: 320 nm The composition of Ag in $Li_xAg_yPO_z$ is comparable to the composition of Cu in the $Li_{2.2}Cu_{2.2}PO_{4.0}$ according to Reference Example 1-1. The sputter rates of the positive electrode active materials according to Reference Example 1-1 and Reference Example 2-3 are nearly equal to each other.

(Charge and Discharge Test)

In the same way as in Reference Example 2-1, a charge and discharge test was carried out for the solid electrolyte battery according to Reference Example 2-3. The measurement result is shown in FIG. 15.

Figure 15:
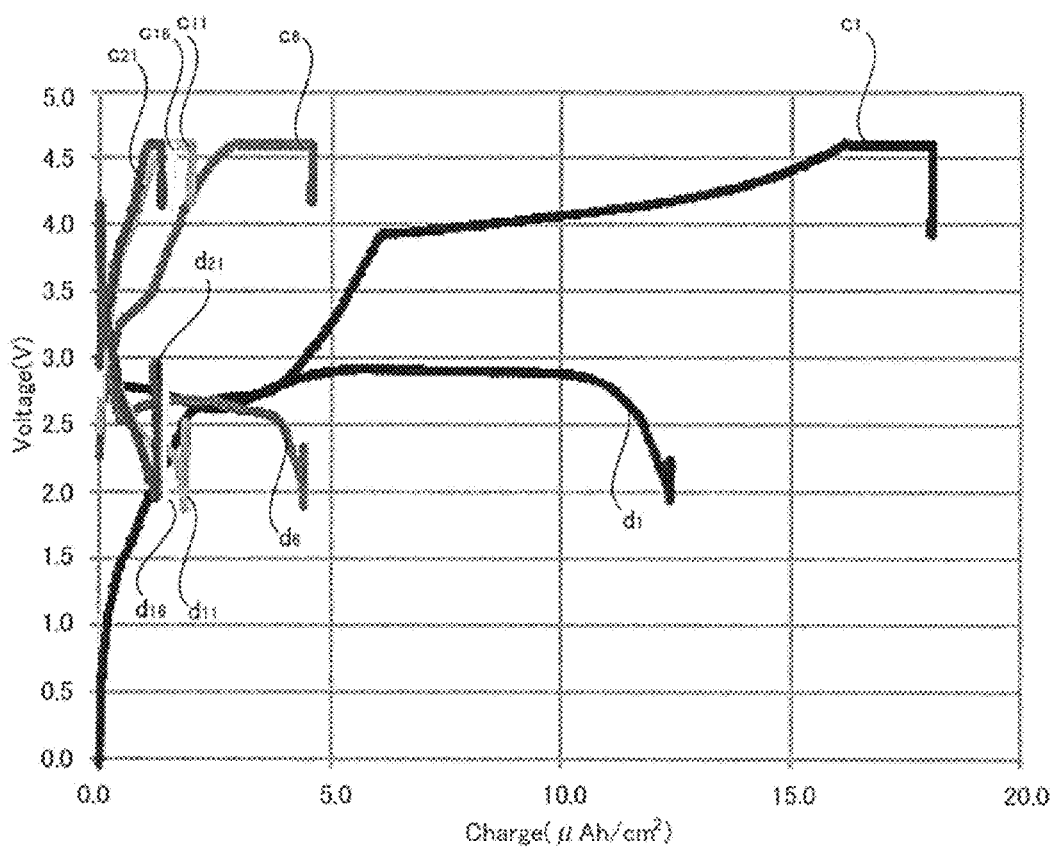
FIG. 15 is a graph showing a charging-discharging curve according to Reference Example 2-3.

As shown in FIG. 15, a high capacity was achieved in the initial discharge. In addition, charge and discharge are possible, and the discharge potential has plateau achieved at a potential close to 3 V. The durability against repeated charge and discharge is not able to be considered high, while the buttery is suitable for use in charge and discharge several times.

Reference Example 2-4

A solid electrolyte battery was prepared in the same way as in Reference Example 2-1, except that the positive electrode active material film 40 was formed under the following film formation conditions.

(Positive Electrode Active Material Film)

The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and $LiCoO_2$
Target Size: Φ6 inches
Sputtering Gas: Ar (80%)+$O_2$ (20%) 20 sccm, 0.10 Pa
Sputtering Power: $Li_3PO_4$1000 W (RF), $LiCoO_2$1000 W (RF)
Film Thickness: 250 nm The composition of Co in $Li_xCo_yPO_z$ is comparable to the composition of Cu in the $Li_{2.2}Cu_{2.2}PO_{4.0}$ according to Reference Example 1-1.

(Charge and Discharge Test)

A charge and discharge test was carried out for the solid electrolyte battery according to Reference Example 2-4. It is to be noted that the charge was carried out at a charging current of 50 μA and a charge cutoff voltage of 5.0 V. The discharge was carried out at a discharging current of 50 μA and a discharge cutoff voltage of 2 V. It is to be noted that the current of 50 μA corresponds to 6C (a current value for charging/discharging the theoretical capacity for 0.1 hours). The measurement result is shown in FIG. 16.

Figure 16:
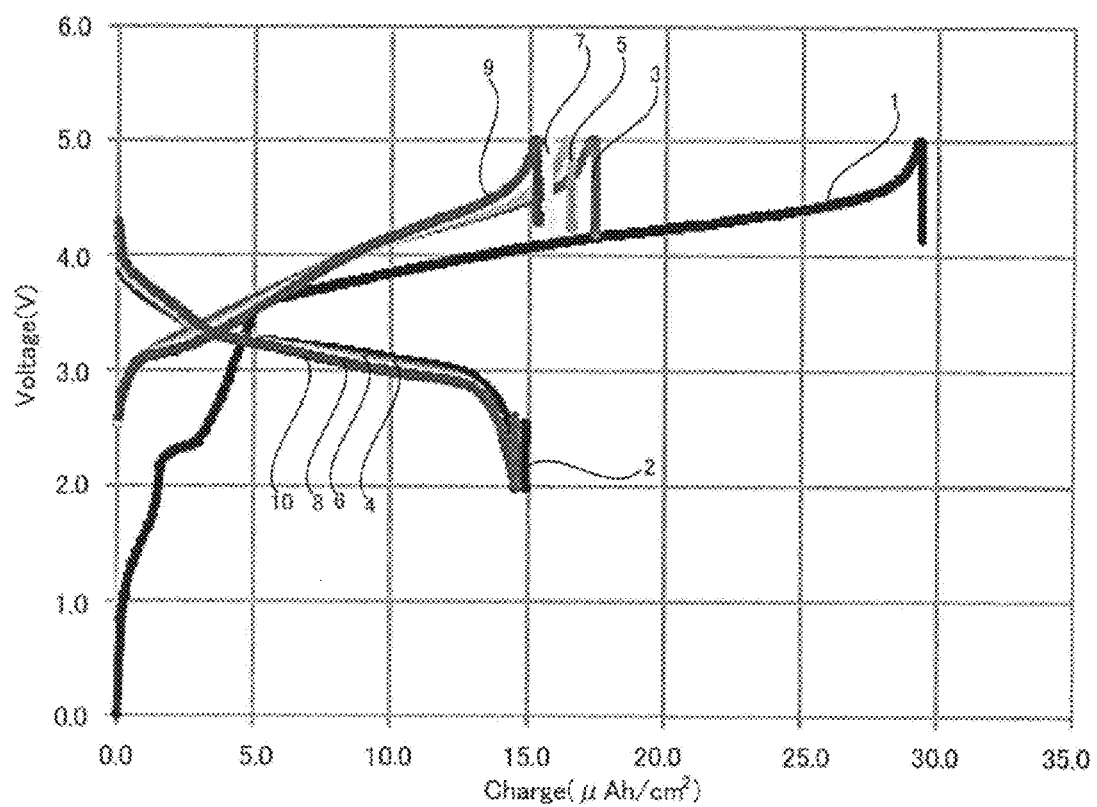
FIG. 16 is a graph showing a charging-discharging curve according to Reference Example 2-4.

As shown in FIG. 16, favorable charge-discharge characteristics have been achieved with high discharge potentials of 3 V or more and with almost no degradation up to charge and discharge repeated ten times.

Reference Example 2-5

A solid electrolyte battery was prepared in the same way as in Reference Example 2-1, except that the positive electrode active material film 40 was formed under the following film formation conditions.
(Positive Electrode Active Material Film)

The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and Au
Target Size: Φ6 inches
Sputtering Gas: Ar (80%)+$O_2$ (20%) 20 sccm, 0.10 Pa
Sputtering Power: $Li_3PO_4$1000 W (RF), Au170 W(DC)
Film Thickness: 250 nm The sputter power for Au was adjusted so that the composition of Au in the $Li_xAu_yPO_z$ was comparable to Cu in the $Li_{2.2}Cu_{2.2}PO_{4.0}$ according to Reference Example 1-1.

(Charge and Discharge Test)

In the same way as in Reference Example 2-4, a charge and discharge test was carried out for the solid electrolyte battery according to Reference Example 2-5. The measurement result is shown in FIG. 17.

Figure 17:
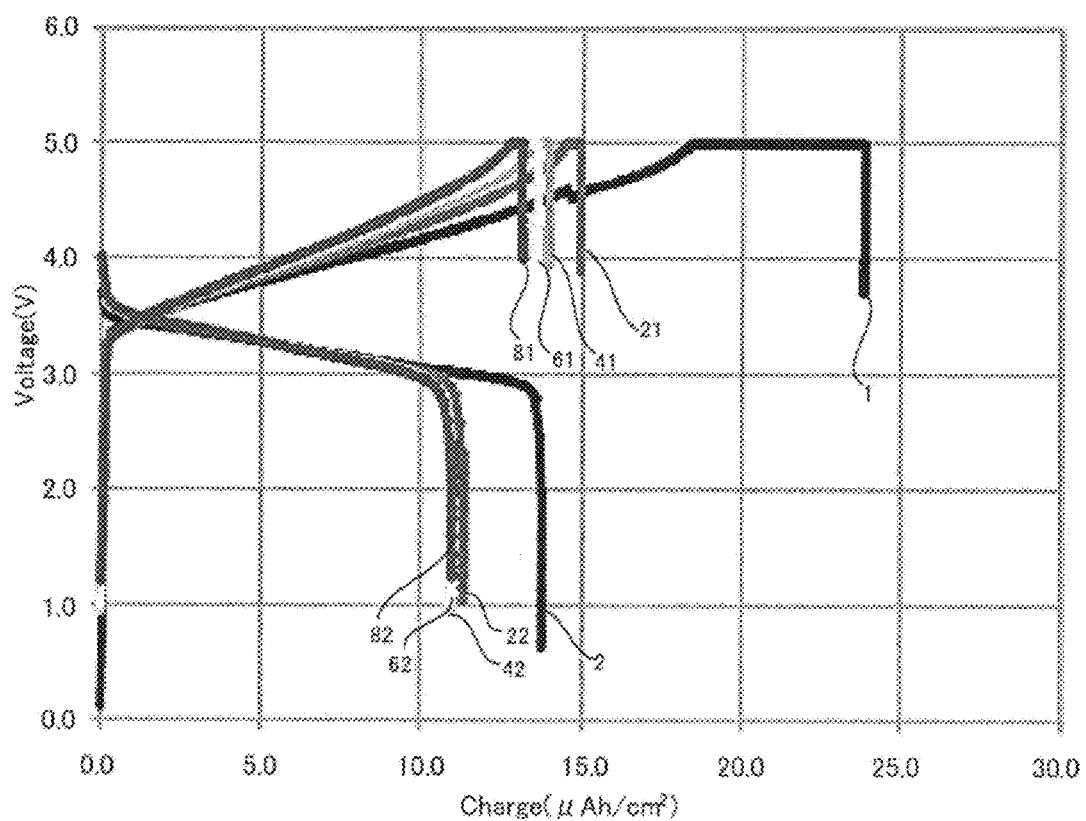
FIG. 17 is a graph showing a charging-discharging curve according to Reference Example 2-5.

As shown in FIG. 17, favorable results have been achieved with high discharge potentials of 3 V or more and with small capacity degradation up to discharge repeated eighty times.

Reference Example 2-6

A solid electrolyte battery was prepared in the same way as in Reference Example 1-1, except that the positive electrode active material film 40 was formed under the following film formation conditions.
(Positive Electrode Active Material Film)

The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and Pd
Target Size: Φ6 inches
Sputtering Gas: Ar (80%)+$O_2$ (20%) 20 sccm, 0.10 Pa
Sputtering Power: $Li_3PO_4$1000 W (RF), Pd65 W(DC)
Film Thickness: 238 nm The sputter power for Pd was adjusted so that the composition of Pd in the $Li_xPd_yPO_z$ was comparable to Cu in the $Li_{2.2}Cu_{2.2}PO_{4.0}$ according to Reference Example 1.

(Charge and Discharge Test)

In the same way as in Reference Example 2-4, a charge and discharge test was carried out for the solid electrolyte battery according to Reference Example 2-6. The measurement result is shown in FIG. 18.

Figure 18:
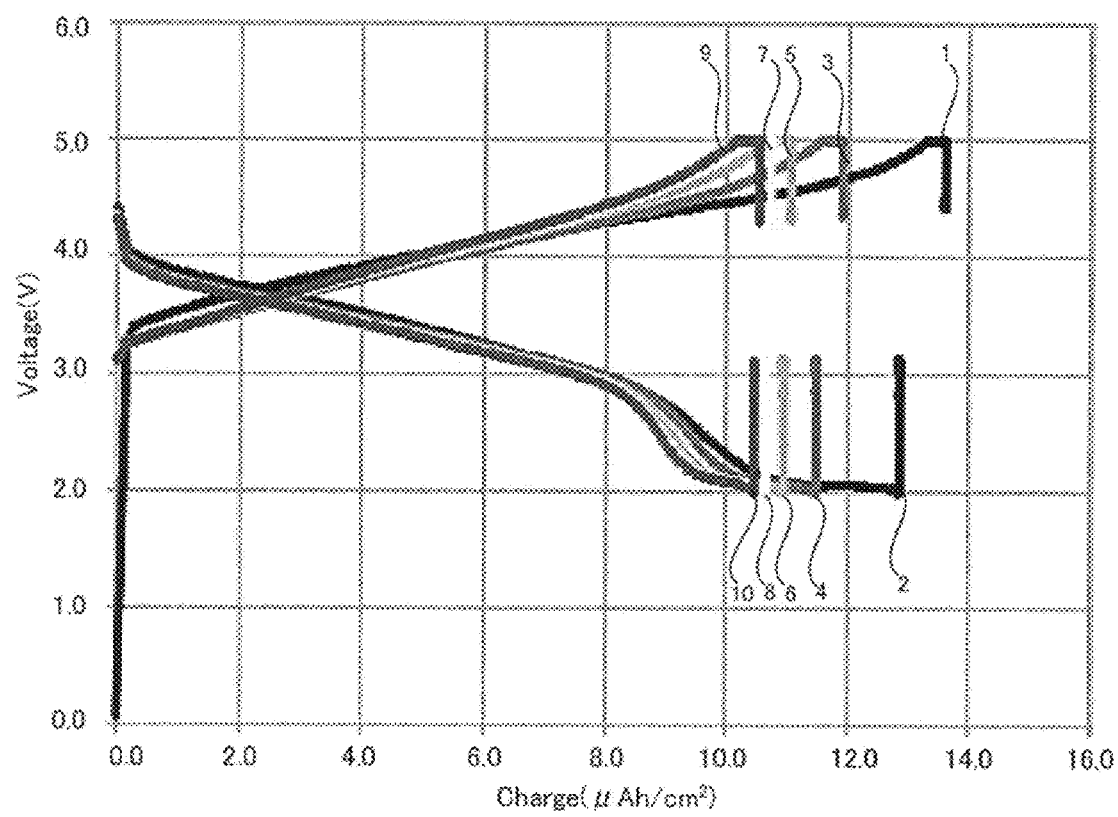
FIG. 18 is a graph showing a charging-discharging curve according to Reference Example 2-6.

As shown in FIG. 18, the capacity is sufficiently high while the discharge potentials are classified into a 3 V or more section and a 2 V or more section, thereby achieving a practical battery. In addition, the durability is also high against repeated charge and discharge.

Reference Example 3-1

A solid electrolyte battery was prepared in the same way as in Reference Example 1-1, except that the positive electrode active material film 40 was formed under the following film formation conditions.
(Positive Electrode Active Material Film)

The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and MgO
Target Size: Φ6 inches
Sputtering Gas: Ar (80%)+$O_2$ (20%) 20 sccm, 0.10 Pa
Sputtering Power: $Li_3PO_4$800 W (RF), MgO1400 W (RF)
Film Thickness: 180 nm Reference Example 3-2

A solid electrolyte battery was prepared in the same way as in Reference Example 1-1, except that the positive electrode active material film 40 was formed under the following film formation conditions.
(Positive Electrode Active Material Film)

The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and V
Target Size: Φ6 inches
Sputtering Gas: Ar (80%)+$O_2$ (20%) 20 sccm, 0.10 Pa
Sputtering Power: $Li_3PO_4$1000 W (RF), V650 W (RF)
Film Thickness: 170 nm Reference Example 3-3

A solid electrolyte battery was prepared in the same way as in Reference Example 1-1, except that the positive electrode active material film 40 was formed under the following film formation conditions.

(Positive Electrode Active Material Film)
The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and Cr
Target Size: Φ6 inches
Sputtering Gas: Ar (80%)+$O_2$ (20%) 20 sccm, 0.10 Pa
Sputtering Power: $Li_3PO_4$1000 W (RF), Cr350 W (RF)
Film Thickness: 190 nm Reference Example 3-4

A solid electrolyte battery was prepared in the same way as in Reference Example 1-1, except that the positive electrode active material film 40 was formed under the following film formation conditions.
(Positive Electrode Active Material Film)
The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and ZnO
Target Size: Φ6 inches
Sputtering Gas: Ar (80%)+$O_2$ (20%) 20 sccm, 0.10 Pa
Sputtering Power: $Li_3PO_4$1000 W (RF), ZnO780 W (RF)
Film Thickness: 240 nm Reference Example 3-5

A solid electrolyte battery was prepared in the same way as in Reference Example 1-1, except that the positive electrode active material film 40 was formed under the following film formation conditions.
(Positive Electrode Active Material Film)
The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and $Ga_2O_3$
Target Size: Φ6 inches
Sputtering Gas: Ar (80%)+$O_2$ (20%) 20 sccm, 0.10 Pa
Sputtering Power: $Li_3PO_4$1000 W (RF), $Ga_2O_3$700 W (RF)
Film Thickness: 220 nm Reference Example 3-6

A solid electrolyte battery was prepared in the same way as in Reference Example 1-1, except that the positive electrode active material film 40 was formed under the following film formation conditions.
(Positive Electrode Active Material Film)
The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and $In_2O_3$
Target Size: Φ6 inches
Sputtering Gas: Ar (80%)+$O_2$ (20%) 20 sccm, 0.10 Pa
Sputtering Power: $Li_3PO_4$1000 W (RF), $In_2O_3$470 W (RF)
Film Thickness: 265 nm Reference Example 3-7

A solid electrolyte battery was prepared in the same way as in Reference Example 1-1, except that the positive electrode active material film 40 was formed under the following film formation conditions.
(Positive Electrode Active Material Film)
Sputtering System (manufactured by ANELVA COPORATION, C-3103)
Target Composition: Co-Sputtering of $Li_3PO_4$ and $SnO_2$
Target Size: Φ6 inches
Sputtering Gas: Ar (80%)+$O_2$ (20%) 20 sccm, 0.10 Pa
Sputtering Power: $Li_3PO_4$1000 W (RF), $SnO_2$200 W (RF)
Film Thickness: 240 nm Reference Example 3-8

A solid electrolyte battery was prepared in the same way as in Reference Example 1-1, except that the positive electrode active material film 40 was formed under the following film formation conditions.
(Positive Electrode Active Material Film)
The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and Sb
Target Size: Φ6 inches
Sputtering Gas: Ar (80%)+$O_2$ (20%) 20 sccm, 0.10 Pa
Sputtering Power: $Li_3PO_4$1000 W (RF), Sb70 W (RF)
Film Thickness: 230 nm Reference Example 3-9

A solid electrolyte battery was prepared in the same way as in Reference Example 1-1, except that the positive electrode active material film 40 was formed under the following film formation conditions.
The formation of the positive electrode active material film was carried out with the following sputtering system and film formation conditions.
(Positive Electrode Active Material Film)
Sputtering System (manufactured by ANELVA COPORATION, C-3103)
Target Composition: Co-Sputtering of $Li_3PO_4$ and $HfO_2$
Target Size: Φ6 inches
Sputtering Gas: Ar (80%)+$O_2$ (20%) 20 sccm, 0.10 Pa
Sputtering Power: $Li_3PO_4$1000 W (RF), $HfO_2$1000 W (RF)
Film Thickness: 160 nm Reference Example 3-10

A solid electrolyte battery was prepared in the same way as in Reference Example 1-1, except that the positive electrode active material film 40 was formed under the following film formation conditions.
(Positive Electrode Active Material Film)
The formation of the positive electrode active material film was carried out with the following sputtering system and film formation conditions.
Sputtering System (manufactured by ANELVA COPORATION, C-3103)
Target Composition: Co-Sputtering of $Li_3PO_4$ and W
Target Size: Φ6 inches
Sputtering Gas: Ar (80%)+$O_2$ (20%) 20 sccm, 0.10 Pa
Sputtering Power: $Li_3PO_4$1000 W (RF), W150 W (RF)

Film Thickness: 230 nm

As a result of carrying out a charge and discharge test for Reference Example 3-1 to Reference Example 3-10 in the same way as in Reference Example 2-1, the capacity is extremely low, and remains at 1 to 10 mAh/g in terms of positive electrode capacity in each case. This capacity is nearly equal to the result of carrying out a charge and discharge test with only LiPON sandwiched between electrodes. Therefore, it has been determined that the lithium phosphate compound containing Li, M, P, and O (M is Mg, V, Cr, Zn, Ga, In, Sn, Sb, Hf, or W) fail to function as a positive electrode active material.

Test Examples

A plurality of samples (solid electrolyte batteries) was prepared with varying composition ratios y and z in $Li_xNi_yPO_z$ constituting a positive electrode active material film, and the capacity was measured for these samples.

The same configuration as in Reference Example 2-1 was adopted for the film configurations of the samples. More specifically, Polycarbonate Substrate/SiN (50 nm)/Ti (100 nm)/$Li_xNi_yPO_z$ (340 nm)/$Li_3PO_{4-x}N_x$ (400 nm)/$LiCoO_2$ (10 nm)/Ni (200 nm)/Ultraviolet Curable Resin (20 μm)/SiN (50 nm).

For each sample, the sputtering power was appropriately varied among the film formation conditions for the positive electrode active material film 40 to prepare a plurality of samples each with the varying composition ratio y of Ni and composition ratio z of oxygen in $Li_xNi_yPO_z$ constituting the positive electrode active material film 40. For each of the plurality of samples prepared, the samples were charged and discharged under the same conditions as in Reference Example 2-1, and the charge-discharge capacity in this case was obtained for each sample. The measurement result is shown in FIG. 19.

Figure 19:
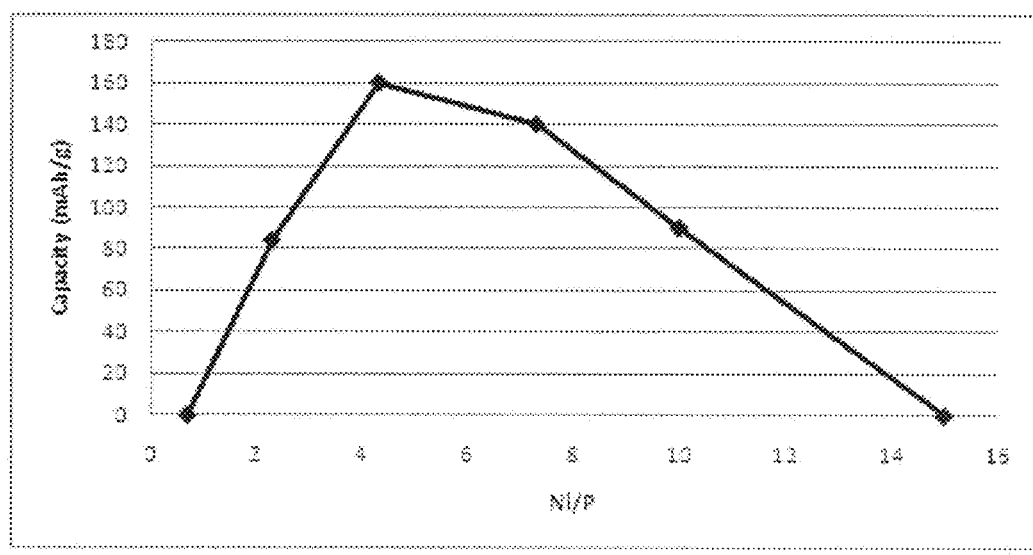
FIG. 19 is a graph plotting the composition ratio of nickel and capacity for test examples.
Figure 20:
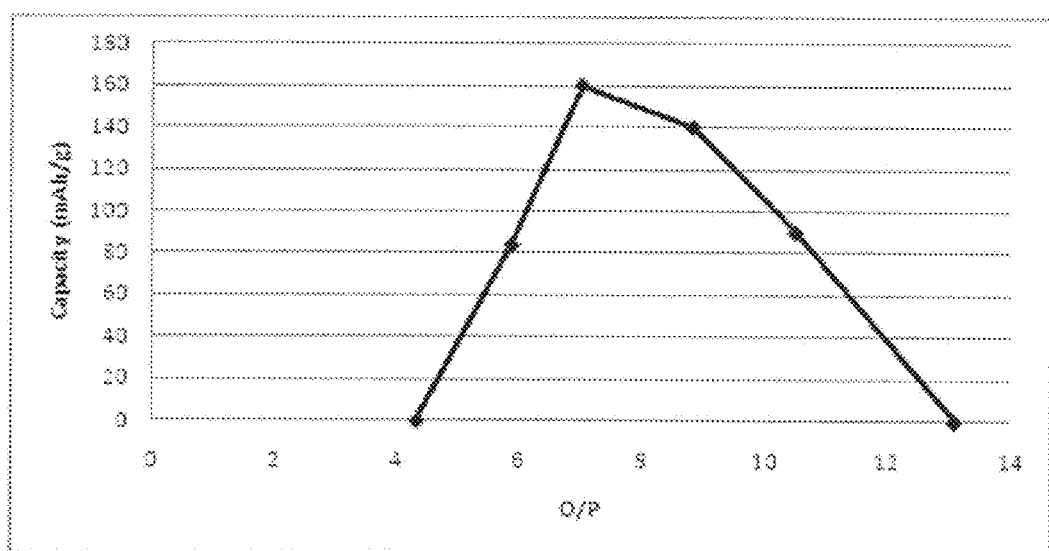
FIG. 20 is a graph plotting the composition ratio of oxygen and capacity for test examples.
Figure 21:
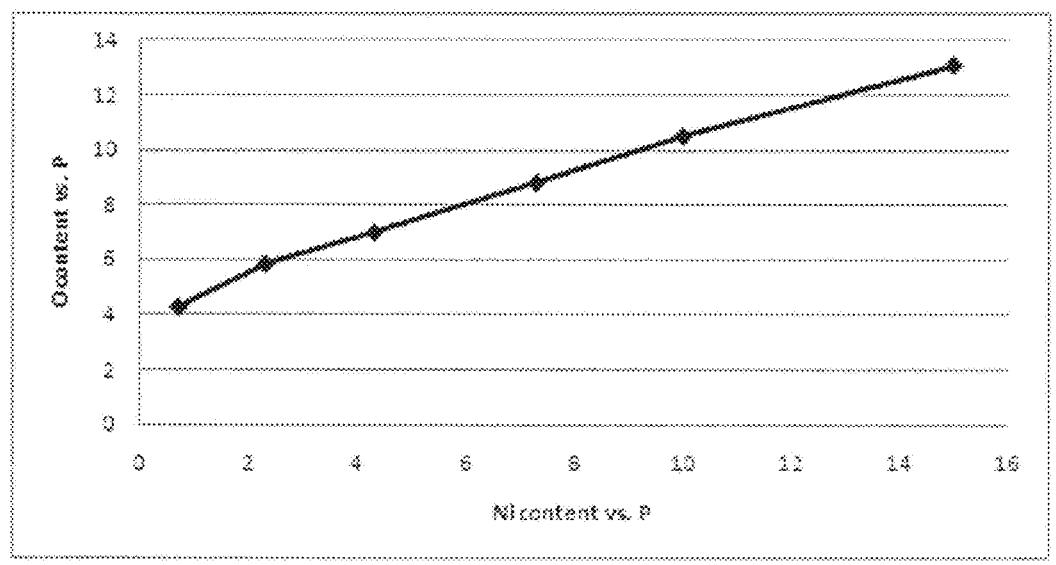
FIG. 21 is a graph plotting the composition ratio of nickel and the composition ratio of oxygen.

As shown in FIG. 19, when the composition ratio y of the $Li_xNi_yPO_z$ constituting the positive electrode active material film 40 is less than 2 or greater than 10, the energy density is decreased to half of the peak. Therefore, it has been determined that the composition ratio y of nickel in the $Li_xNi_yPO_z$ is preferably 2 or more and 10 or less. In addition, FIG. 20 shows a plot of the oxygen composition z in this case, and FIG. 21 shows a graph plotted with the Ni composition on the horizontal axis in the case of regarding the P composition as 1 and the 0 composition on the vertical axis in the case of regarding the P composition as 1. The following is determined from the graphs. When the Ni composition is increased, the oxygen composition is accordingly increased. The oxygen composition is an appropriate amount corresponding to the compositions of Ni and P.

3. Other Embodiment

The present technique is not to be considered limited to the embodiments of the present technique described above, and various modifications and applications can be made without departing from the scope of the present technique. For example, the film configuration of the solid electrolyte battery is not to be considered limited to the configurations described above. For example, the configurations with the inorganic insulating films omitted therefrom may be adopted in the first to second embodiments. In addition, as a configuration, more than one stacked body may be formed sequentially by stacking, electrically connected in series, and coated with the entirely protective film 80. In addition, as a configuration, on a substrate, more than one stacked body may be formed by placement in parallel, electrically connected in parallel or series, and coated with the entirely protective film 80. Furthermore, for example, the structure of the solid electrolyte battery is not to be considered limited to the examples described above. For example, for example, the positive electrode side current collector film 30 may be composed of a metal plate of a positive electrode current collector material. The negative electrode side current collector film 70 may be composed of a metal plate of a negative electrode current collector material. In addition, as a configuration, the negative electrode side may be provided on the substrate side.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

10 Substrate
20 Inorganic insulating film
30 Positive electrode side current collector film
31 Positive electrode protective film
40 Positive electrode active material film
50 Solid electrolyte film
60 Negative electrode active material film
64 Negative electrode potential formation layer
70 Negative electrode side current collector film
80 Entirely protective film

The invention claimed is:

1. A solid electrolyte battery comprising:
a positive electrode side layer;
a negative electrode side layer; and
a solid electrolyte layer between the positive electrode side layer and the negative electrode side layer,
wherein the positive electrode side layer includes:
a positive electrode current collector layer;
a positive electrode active material layer comprising a lithium-containing material in an amorphous state; and
a positive electrode protective layer between the positive electrode current collector layer and the positive electrode active material layer,
wherein the positive electrode protective layer is capable of suppressing a reaction between the positive electrode current collector layer and the positive electrode active material layer.

2. The solid electrolyte battery according to claim 1, wherein a material constituting the positive electrode protective layer is a lithium oxide comprising lithium and oxygen.

3. The solid electrolyte battery according to claim 2, wherein the lithium oxide comprising lithium and oxygen is a lithium-transition metal oxide comprising lithium, a transition metal, and oxygen.

4. The solid electrolyte battery according to claim 3, wherein the transition metal is at least one selected from the group consisting of: Co, Mn, and Ni.

5. The solid electrolyte battery according to claim 3, wherein the lithium-transition metal oxide is $LiCoO_2$, $LiMn_2O_4$, or $LiNiO_2$.

6. The solid electrolyte battery according to claim 3, wherein the lithium-transition metal oxide is crystalline or microcrystalline.

7. The solid electrolyte battery according to claim 1, wherein the lithium-containing material is an oxide comprising: lithium, phosphorus, oxygen, and at least one element selected from the group consisting of: Cu, Ni, Co, Mn, Au, Ag, and Pd.

8. The solid electrolyte battery according to claim 7, wherein the lithium-containing material is a lithium phosphate compound represented by a following formula (1):

$Li_xCu_yPO_4$   Formula (1)

where x represents a composition ratio of lithium, y represents a composition ratio of copper, x satisfies $1.0 \leq x \leq 5.0$; and y satisfies $1.0 \leq y \leq 4.0$.

9. The solid electrolyte battery according to claim 1, wherein:
the negative electrode side layer includes a negative electrode current collector layer and a negative electrode side protective layer comprising an oxide containing at least one element selected from the group consisting of: Mn, Co, Fe, P, Ni, and Sn, and
a negative electrode active material layer comprising lithium is formed at an interface between the solid electrolyte layer and the negative electrode side protective layer during charging.

10. The solid electrolyte battery according to claim 1, comprising a substrate,
wherein a stacked body including the positive electrode side layer, the negative electrode side layer, and the solid electrolyte layer is formed on the substrate.

11. The solid electrolyte battery according to claim 10, wherein the positive electrode current collector layer, the positive electrode protective layer, and the positive electrode active material layer are provided in this order from a side of the substrate.

12. The solid electrolyte battery according to claim 10, wherein the substrate is a resin substrate.

13. The solid electrolyte battery according to claim 10, comprising an inorganic insulating film provided between the substrate and the positive electrode side layer.

14. The solid electrolyte battery according to claim 1, wherein the positive electrode side layer, the negative electrode side layer, and the solid electrolyte layer each comprise a film formed by physical vapor deposition, chemical vapor deposition, electroplating, electroless plating, an application method, a sol-gel method, a solid-phase epitaxy method, or a Langmuir-Blodgett method.

15. The solid electrolyte battery according to claim 14, wherein the positive electrode side protective layer has a thickness of 5 nm or more and 20 nm or less.

16. The solid electrolyte battery according to claim 1, wherein the solid electrolyte layer comprises a solid electrolyte film containing $Li_3PO_4$, $Li_3PO_{4-x}N_x$, $Li_xB_2O_{3-y}N_y$, $Li_4SiO_4$—$Li_3PO_4$, and $Li_4SiO_4$—$Li_3VO_4$.

* * * * *